US007853492B1

(12) United States Patent
Kirklin et al.

(10) Patent No.: US 7,853,492 B1
(45) Date of Patent: *Dec. 14, 2010

(54) SYSTEM FOR MERCHANDISE ORDERING AND ORDER FULFILLMENT

(76) Inventors: Frederic J. Kirklin, 5535 Endwood Trail, Northfield, MN (US) 55057;
James P. Tersteeg, 918 S. Ramsey, Redwood Falls, MN (US) 56283;
Patricia J. Tersteeg, 918 S. Ramsey, Redwood Falls, MN (US) 56283

( * ) Notice: Subject to any disclaimer, the term of this patent is extended or adjusted under 35 U.S.C. 154(b) by 74 days.

This patent is subject to a terminal disclaimer.

(21) Appl. No.: 12/077,148

(22) Filed: Mar. 17, 2008

(51) Int. Cl.
*G06Q 10/00* (2006.01)

(52) U.S. Cl. .................. 705/28; 705/8; 280/79.2; 280/79.3; 414/807; 414/270; 414/271; 414/272; 414/273

(58) Field of Classification Search ............... 280/79.2, 280/79.3; 340/10.4, 825.49; 700/231; 235/462.01, 235/472.01, 383; 705/8, 17, 23; 414/807, 414/270, 271, 272, 273
See application file for complete search history.

(56) References Cited

U.S. PATENT DOCUMENTS

| 4,088,237 | A | * | 5/1978 | Brown ................. 414/807 |
|---|---|---|---|---|
| 4,180,204 | A | | 12/1979 | Koenig et al. |
| 4,484,029 | A | | 11/1984 | Kenney |
| 4,621,325 | A | | 11/1986 | Naftzger et al. |
| 4,654,482 | A | | 3/1987 | DeAngelis |
| 4,734,858 | A | | 3/1988 | Schlafly |
| 4,797,913 | A | | 1/1989 | Kaplan et al. |
| 4,803,348 | A | | 2/1989 | Lohrey |
| D312,628 | S | | 12/1990 | Yokoi et al. |
| D313,224 | S | | 12/1990 | Yokoi et al. |
| D317,757 | S | | 6/1991 | Yokoi et al. |
| 5,066,853 | A | | 11/1991 | Brisson |
| 5,113,428 | A | | 5/1992 | Fitzgerald |
| 5,125,022 | A | | 6/1992 | Hunt et al. |
| D330,195 | S | | 10/1992 | Savio |
| 5,210,791 | A | | 5/1993 | Krasik |
| 5,231,670 | A | | 7/1993 | Goldhor et al. |
| 5,235,509 | A | | 8/1993 | Mueller et al. |
| 5,271,703 | A | | 12/1993 | Lindqvist et al. |

(Continued)

FOREIGN PATENT DOCUMENTS

FR 359667 3/1990

(Continued)

OTHER PUBLICATIONS

Adhikari, Richard. "Help desks encouraging end users to help themselves." Software Magazine Aug. 1, 1994: ABI/INFORM Global, ProQuest. Web. Aug. 4, 2010.*

(Continued)

*Primary Examiner*—Matthew S Gart
*Assistant Examiner*—Olusegun Goyea
(74) *Attorney, Agent, or Firm*—Jeffrey A. Proehl; Woods, Fuller, Shultz and Smith, PC

(57) ABSTRACT

A system for merchandise ordering and order fulfillment for highly efficient and accessible remote placement and assembly of merchandise orders. The system includes a network comprising a programmed central station and remote stations of various types permitting customer entry and employee fulfillment of merchandise orders.

22 Claims, 36 Drawing Sheets

U.S. PATENT DOCUMENTS

| | | | |
|---|---|---|---|
| 5,276,617 A * | 1/1994 | Hiroya et al. | 701/24 |
| 5,303,299 A | 4/1994 | Hunt et al. | |
| 5,310,997 A | 5/1994 | Roach et al. | |
| 5,323,448 A | 6/1994 | Biggs et al. | |
| 5,345,501 A * | 9/1994 | Shelton | 379/88.2 |
| 5,389,917 A | 2/1995 | LaManna et al. | |
| 5,395,206 A * | 3/1995 | Cerny, Jr. | 414/807 |
| 5,424,524 A | 6/1995 | Ruppert et al. | |
| 5,451,998 A | 9/1995 | Hamrick | |
| 5,454,063 A | 9/1995 | Rossides | |
| 5,465,291 A * | 11/1995 | Barrus et al. | 379/67.1 |
| RE35,184 E | 3/1996 | Walker | |
| 5,505,473 A * | 4/1996 | Radcliffe | 280/79.2 |
| 5,561,710 A | 10/1996 | Helms | |
| 5,666,493 A | 9/1997 | Wojcik et al. | |
| 5,694,551 A | 12/1997 | Doyle et al. | |
| 5,720,157 A * | 2/1998 | Ross | 53/445 |
| 5,748,711 A | 5/1998 | Scherer | |
| 5,808,289 A * | 9/1998 | Becker | 235/472.01 |
| 5,808,894 A * | 9/1998 | Wiens et al. | 700/231 |
| 5,850,187 A | 12/1998 | Carrender et al. | |
| 5,857,156 A * | 1/1999 | Anderson | 455/517 |
| 5,873,070 A | 2/1999 | Bunte et al. | |
| 5,890,136 A | 3/1999 | Kipp | |
| 5,918,213 A | 6/1999 | Bernard et al. | |
| 6,144,848 A | 11/2000 | Walsh et al. | |

FOREIGN PATENT DOCUMENTS

| | | |
|---|---|---|
| JP | 40 2-288654 | 11/1990 |
| JP | 40 4-33562 | 2/1992 |
| WO | WO 90/11661 | 10/1990 |

OTHER PUBLICATIONS

Forger, Gary. "How Maidenform saved space and improved product flow." Modern Materials Handling Dec. 1, 1993: ABI/INFORM Global, ProQuest. Web. Aug. 4, 2010.*

"Picking Cases in the Warehouse: More Options than Ever." Material Handling Engineering Jul. 1, 1986: ABI/INFORM Global, ProQuest. Web. Aug. 4, 2010.*

Bozer, Yavuz Ahmet. Optimizing Throughput Performance in Designing Order Picking Systems (Warehousing, Storage). Diss. Georgia Institute of Technology, 1985. Dissertations & Theses: Full Text, ProQuest. Web. Aug. 4, 2010.*

Denise Zimmerman, "Consumer-direct delivery of groceries could capture 5-10% of the grocery market in the future", Supermarket News, Jan. 27, 1997, v. 47, n. 4, p. 59.

Frank Daly et al., "The basics of warehouse management systems", Material Handling Engineering, Mar. 1995, v. 50, n. 3, pp. 61-64.

Mark Henricks, "Haggar Tracking Its Soft Goods With Its Software", Dallas-Forth Worth Business Journal, Jan. 26, 1987, v. 10, n. 22, Dallas, Texas.

Grant Buckler, "Bell Canada Launches Interactive Phone Service", Newsbyte News Network, Nov. 6, 1996, Toronto, Ontario, Canada.

"Electronic Billing Via Internet", Newsbyte News Network, Dec. 21, 1995, Herndon, Virginia.

"Bell Atlantic video-on-demand effort begins commercial transition; company winds up market . . . ", Company Business and Marketing, Oct. 14, 1996, v.11, p. 11, Edge Publishing.

Declaration of Frederic J. Kirklin, James P. Tersteeg and Patricia J. Tersteeg under 37 CFR Section 1.132, Jun. 12, 2001.

Denise Zimmerman, "Barlow Automates Ordering by Phone", Supermarket News, Jul. 24, 1995, v. 45, n. 30, p. 21.

"Home Delivery: Minnesota Style—Redwood Falls Grocer Introduces Computerized System for Home-Delivery and Pickup", Minnesota Grocer, Fall 1995, pp. 12, 14-15.

"A Low-Tech Solution to a High-Tech Problem", Grocery Marketing, Jun. 1996, pp. 56-58.

* cited by examiner

US 7,853,492 B1

SYSTEM FOR MERCHANDISE ORDERING AND ORDER FULFILLMENT

CROSS REFERENCE TO RELATED APPLICATION

This application claims the benefit of U.S. Provisional Application No. 60/037,439, filed Feb. 7, 1997.

BACKGROUND OF THE INVENTION

1. Field of the Invention

The present invention relates to computer software and apparatus for remote placement of merchandise orders and more particularly pertains to a new system for merchandise ordering and order fulfillment for highly efficient and accessible remote placement and assembly of merchandise orders.

2. Description of the Prior Art

The use of computer software and apparatus for remote placement of merchandise orders is known in the prior art. More specifically, computer software and apparatus for remote placement of merchandise orders heretofore devised and utilized are known to consist basically of familiar, expected and obvious structural configurations, notwithstanding the myriad of designs encompassed by the crowded prior art which have been developed for the fulfillment of countless objectives and requirements.

While these known systems fulfill their respective, particular objectives and requirements, the aforementioned patents do not disclose a new system for merchandise ordering and order fulfillment. The inventive system includes a network comprising a programmed central station and remote stations of various types permitting customer entry and employee fulfillment of merchandise orders.

In these respects, the system for merchandise ordering and order fulfillment according to the present invention substantially departs from the conventional concepts and designs of the prior art, and in so doing provides an apparatus primarily developed for the purpose of creating and assembling customer orders of various products located in a product storage space.

SUMMARY OF THE INVENTION

In view of the foregoing disadvantages inherent in the known types of computer software and apparatus for remote placement of merchandise orders now present in the prior art, the present invention provides a new system for merchandise ordering and order fulfillment construction wherein the same can be utilized for highly efficient and accessible remote placement and assembly of merchandise orders.

The general purpose of the present invention, which will be described subsequently in greater detail, is to provide a new system for merchandise ordering and order fulfillment apparatus and method which has many of the advantages of the computer software and apparatus for remote placement of merchandise orders mentioned heretofore and many novel features that result in a new system for merchandise ordering and order fulfillment which is not anticipated, rendered obvious, suggested, or even implied by any of the prior art computer software and apparatus for remote placement of merchandise orders, either alone or in any combination thereof.

To attain this, the present invention generally comprises a network comprising a programmed central station and remote stations of various types permitting customer entry and employee fulfillment of merchandise orders.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new system for merchandise ordering and order fulfillment apparatus and method which has many of the advantages of the computer software and apparatus for remote placement and fulfillment of merchandise orders mentioned heretofore and many novel features that result in a new system for merchandise ordering and order fulfillment which is not anticipated, rendered obvious, suggested, or even implied by any of the prior art computer software and apparatus for remote placement of merchandise orders, either alone or in any combination thereof.

It is another object of the present invention to provide a new system for merchandise ordering and order fulfillment which may be easily and efficiently manufactured and marketed.

It is a further object of the present invention to provide a new system for merchandise ordering and order fulfillment which permits the system to be easily and quickly reprogrammed and reconfigured to permit the addition and removal of system functions, preferably at one central station of the system without having to adjust multiple components of the system.

An even further object of the present invention is to provide a new system for merchandise ordering and order fulfillment which is susceptible of a low cost of manufacture with regard to both materials and labor, and which accordingly is then susceptible of low prices of sale to the consuming public, thereby making such system for merchandise ordering and order fulfillment economically available to the buying public.

Still yet another object of the present invention is to provide a new system for merchandise ordering and order fulfillment which provides in the apparatuses and methods of the prior art some of the advantages thereof, while simultaneously overcoming some of the disadvantages normally associated therewith.

Still another object of the present invention is to provide a new system for merchandise ordering and order fulfillment for highly efficient and accessible remote placement and assembly of merchandise orders.

Yet another object of the present invention is to provide a new system for merchandise ordering and order fulfillment which includes a network comprising a programmed central station and remote stations of various types permitting customer entry and employee fulfillment of merchandise orders.

Still yet another object of the present invention is to provide a new system for merchandise ordering and order fulfillment that features automated customer entry of merchandise orders by telephone through telephone-generated tone (also known as Dial Tone Modulated Frequency) communication and through voice communication.

Even still another object of the present invention is to provide a new system for merchandise ordering and order fulfillment that features automated order fulfillment that directs the movement of order assembly personnel through the order assembly process in an efficient manner tailored to the particular layout of the store in which the order is being assembled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
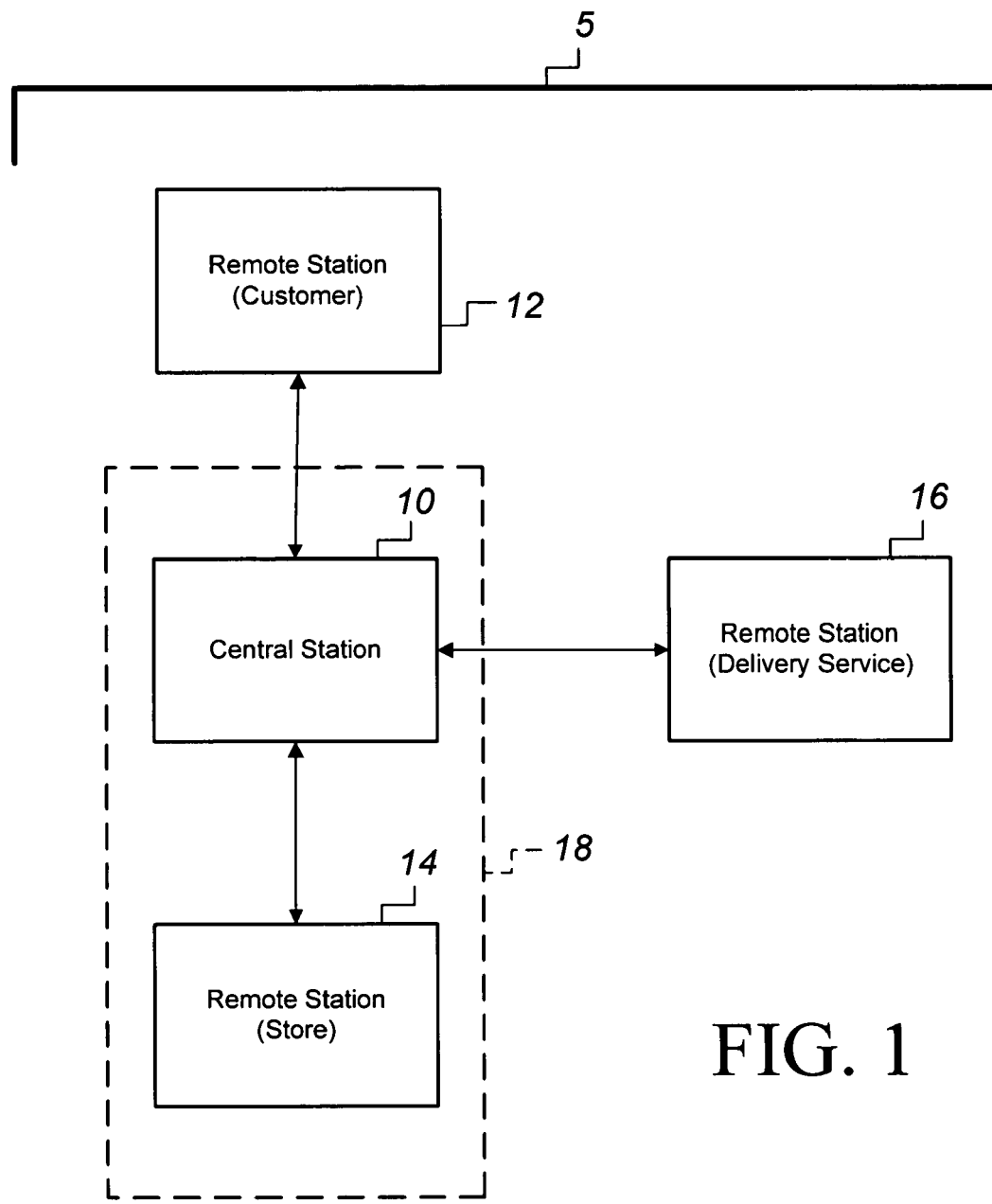
FIG. 1 is a schematic diagrammatical view of a new system for merchandise ordering and order fulfillment according to the present invention.
Figure 2:
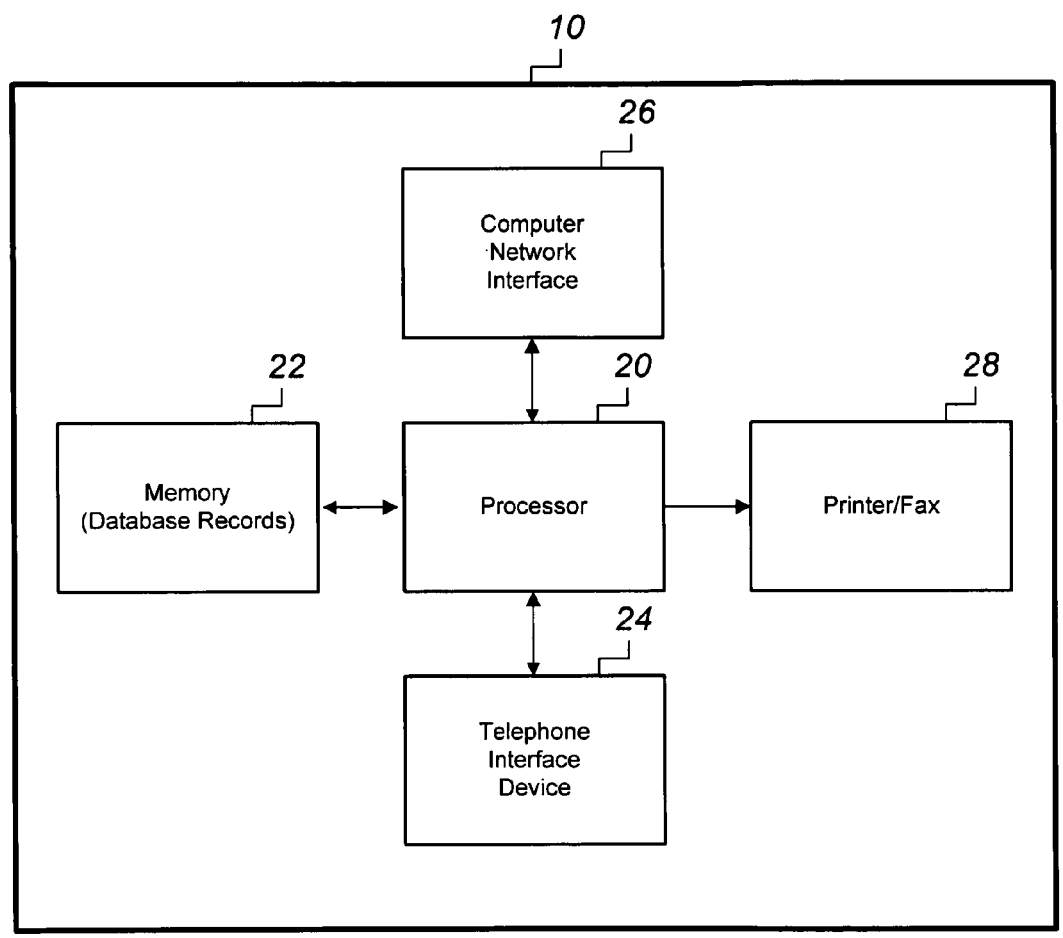
FIG. 2 is a schematic diagrammatical view of a central station of the present invention.
Figure 3:
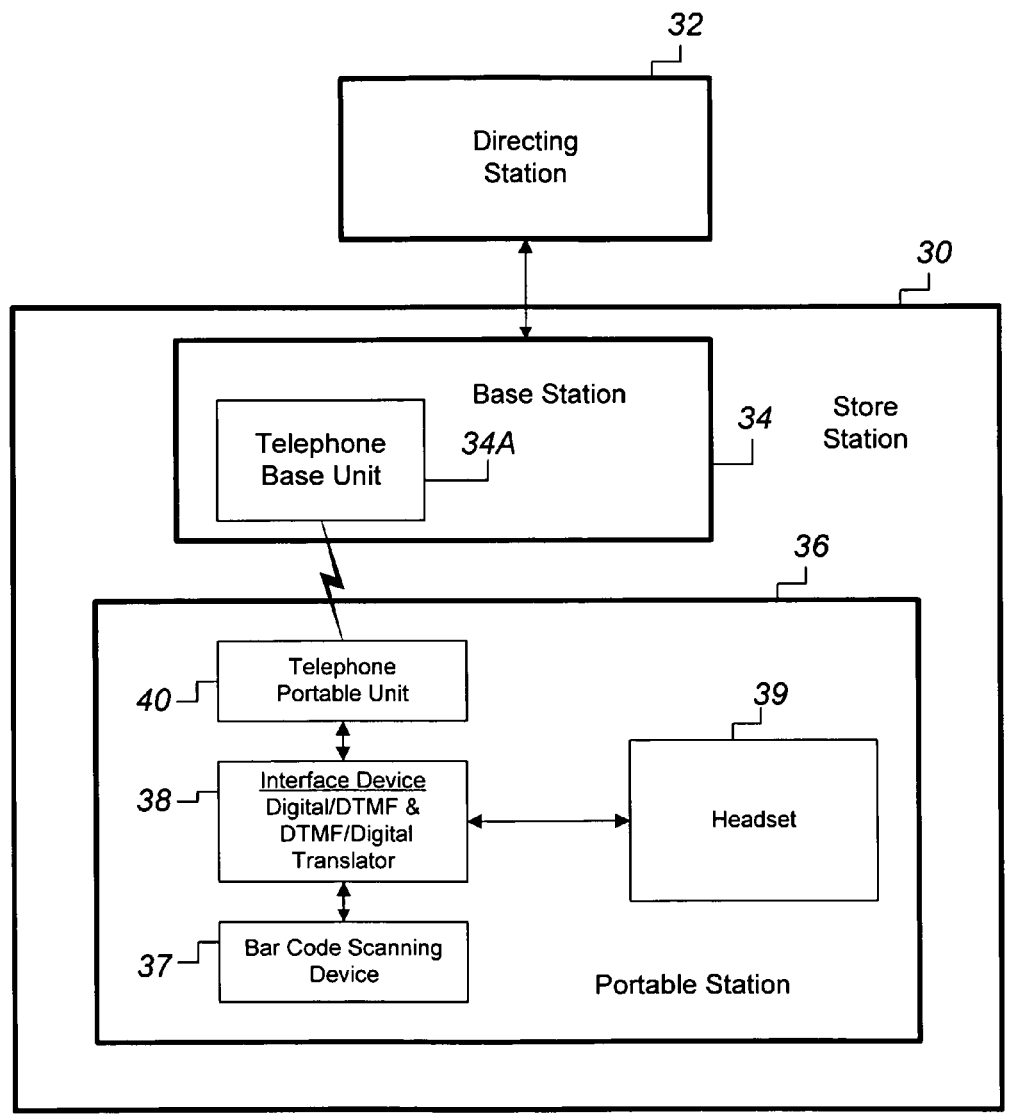
FIG. 3 is a schematic diagrammatical view of a system for order fulfillment of the present invention.

With reference now to the drawings, and in particular to FIGS. 1 through 36 thereof, a new system for merchandise ordering and order fulfillment embodying the principles and concepts of the present invention and generally designated by the reference numeral 5 will be described.

General System Configuration

The system 5 for remote merchandise ordering and remote order fulfillment of the invention preferably comprises a programmed computer at a central station 10 (shown schematically in FIGS. 1 and 2) which is able to communicate with various remote stations (illustratively stations 12, 14, 16). The central station is generally geographically remote from the remote stations of the customers using the system, and may be remote from the store stations or stations, although the central and store stations may have the same geographic locations.

Central Station

The central station 10 of the system 5 of the invention is preferably provided with communication access to the store or stores served by the system, the customers of those stores, and any other entities involved in the system (such as, for example, a delivery service). The central station 10 may be located at a store location, a warehouse location or a central office of a business servicing a chain of more than one individual store locations.

The central station 10 is equipped with a processing means 20 for processing the input and output of data into data records maintained on a database at the central station. The processing means preferably comprises a microprocessor (and the necessary interfacing circuits) of a computer, and ideally a personal computer. Illustratively, a computer employing a microprocessor such as is sold under the tradename "PENTIUM" by the Intel Corporation of Santa Clara, Calif. may be used.

Additionally, the central station 10 preferably includes a memory means 22 on which to store the various database records to be maintained by the processing means of the central station. The memory means 22 preferably comprises a recordable (e.g., through optical or electronic means) storage medium, such as a fixed or removable hard disk, optical disk, magnetic tape, etc., although other memory means may also be used. Illustratively, mirrored hard disk drives having sufficient storage space to maintain the records on the database are employed. Optionally, a backup memory means may also be provided, such a magnetic tape drive.

The types of records maintained by the processor 20 on the database stored on the memory means 22 preferably includes product-related information and customer-related information for each of the stores serviced by the central station 10. Such product-related information may include product identification information comprising an identification number (such as a "Universal Product Code" or other inventory code) and a description of the product. Product inventory information with the number of product items available in the product storage space and in auxiliary storage spaces (if any) may also be included on the database. Product pricing information including the price of each product located in the product storage space may also be stored in the database. A significant and highly important part of the database is the product location information stored thereon, which preferably includes for each product an aisle location value, an aisle side location value and a shelf location value for each product storage space (e.g., supermarket) served by the system. The database also contains customer-related information including customer account information such as address information, general customer preferences for payment and delivery, and the like. Further customer-related information includes, order fulfillment information including product listings for specific customer orders, and the acceptability of product substitutions for the order.

To provide remote access to the processor 22 (and the database) by remote stations, a telephone interface means is provided which is interfaced to the processor and is connected to one or more public telephone lines. The telephone interface means preferably comprises an analog telephone interface device 24 such as an "expansion card" interfaced to the processor 20 of the computer, but may also include a digital telephone interface device 26 for digital network communication between the computers located at the various stations.

Although communication between stations is possible by either analog or digital transmission, the most preferred communication mode is by analog signal transmission because of its availability to the greatest number of potential store customers, and the most preferred telephone interface device 24 is preferably capable of generating analog outgoing signals and recognizing analog incoming signals. Significantly, the central station 10 is preferably capable of communicating with remote access stations via at least two analog data transmission or communication modes.

Ideally, the analog communication mode options include analog data transmission by telephone-generated tones of preselected frequencies, which have been standardized and are often referred to as "Dial Tone Modulated Frequency" tones, or "DTMF" (also under the "Touch-Tone" trademark) and include representations of numerals 0 through 9 and symbols "*" ("star") and "#" ("pound"). DTMF tones have also been assigned to represent the letters "A", "B", "C", and "D", but are not generally available through common home telephones. The telephone-generated tones are transmitted by the remote station 12 (e.g., the customer's telephone) to the analog telephone interface device 24 of the central station 10. Another highly preferred analog communication mode option includes analog data transmission of voice from the remote station 12 (e.g., speaking into the telephone) which is recognized by the central station 10, although digital transmission of the voice signals at any or all portions of the communication system may be used. For both of these options, the analog interface device 24 of the central station communicates to the remote station by the transmission of voice messages. Optionally, a digital communication mode is also provided for the system that permits computer network communication (e.g., over the Internet) between the central station 10 and a remote station 12 computer employed by a customer.

Significantly, the capability of the analog telephone interface device 24 to recognize human voice messages received from the remote station over the telephone line and to generate emulated human voice (or selectively playback prerecorded human voice) messages permits the use of the system 5 by store customers not having the capability to generate DTMF tone on their home phone lines.

Additionally, an output means 28 is preferably provided at the central station 10 for generating printed or hard copies of the records and, optionally, documents based upon the records, such as customer and store invoices and statements. The output means 28 most preferably comprises a computer printer or, optionally, a fax machine.

Remote Access Stations

The remote access station may have various configurations, although preferably the remote access station minimally comprises a telephone, such as is installed in the home of the customer (or in a store), a feature which enables access by a wide range of customers to the central station 10 and the system 5. The remote access station may also comprise a computer, such as a personal computer located in a customer's home that communicates with the central station via a modem or other interface device through a general-access communication network (e.g., the Internet) or through a direct dial-up connection on telephone lines between the interface device of the remote station and the interface device of the central station.

Access by a remote station (such as a customer station 12, a store station 14, and a delivery service station 16) to the central station 10 and its various databases preferably has at least two types or levels of access, with at least one level of access being more restricted than at least one other level of access. Most preferably, the level of access permitted for a remote station depends upon the authorization or capacity of the remote station (i.e., the person) seeking access to the central station. In the most preferred embodiment of the invention, two levels of access to the central station are used, with one access level being more restricted than the other level. One access level is provided for customer or general public access, which is characterized by the remote station having relatively limited access to the central station database. Such limited remote station access may permit access only sufficient to create and manipulate the order records of a single customer account (e.g., based upon entry of the proper access information for that customer account). Another access level is provided for authorized personnel (such as store employees and system administrators) to have access to a greater range of functions of the central station and of record types maintained on the database. This higher level of authorized access may permit access for manipulating customer order records, customer profile or account records, product price records, product description records, product availability records, delivery restriction records, and similar records that are maintained on the database of the central station.

Store Station

The store station 14 is typically a remote station with respect to the central station 10 and is preferably located at the site of the product storage space such as an individual store or at each of the product storage spaces or stores (which the system 5 services) where the inventory of product items are maintained. Optionally, the central station and the local station may both be located at the same location (e.g., in the same store) for single store system installations, as indicated by the broken line box 18 in FIG. 1. The store station 14 typically functions as an order fulfillment station and a price verification station, although other functions may also be performed by the store station.

The most preferred product storage space for use with the system of the invention has products arranged in at least two product rows. Each product row may comprise display racks or shelving structures. An aisle is located between adjacent product rows, such that one product row is located on the left side and another product row is located on the right side of the aisle with respect to a person moving or looking down the length of the aisle. Typically, each product row will have a plurality of vertically spaced product shelves extending along the length of the row for supporting one tier of products above another tier of products. Within the product storage space, each aisle is assigned an aisle value or identifier, such as aisle 1, aisle 2 and so forth, corresponding to the number of aisles in the product storage space. Each side of an aisle is also assigned an aisle side value, for example, the left side of the aisle is assigned one value and the right side is assigned another value. Typically, in most grocery stores, products are arranged in "product groupings" (e.g., groupings of the same or similar types of product items). These product groupings often extend in a vertically-oriented strip or band across a number of shelves, although other physical placements of products within a product grouping are also used. Most preferably, the various product groupings on the shelves of the rows adjacent to the aisles are assigned a value or identification, with, for example, the first product grouping along one side of the aisle being identified as "product group 1", and the groups encountered subsequently as the shopper moves along the aisle being identified as group 2, group 3, etc. Each side of the aisle would have groups numbered from group 1 upward. Optionally, each shelf of a product row may be assigned a shelf value, with the number of shelf values corresponding to the number of shelves on the particular product row adjacent the aisle (e.g., shelf 1 may the lowermost shelf and shelf 2 the next vertically higher shelf). Through this system of assigning location values, each product stored in the product storage space may be assigned a product location representable by an aisle location value, an aisle side location value, and a product group value (or optionally a shelf value). Optionally, other values may be used to represent other means of arranging products in the storage space. The preferred location identification outlined above is highly useful for product storage spaces which comprise the interior of a retail grocery store or supermarket, but may also be applied to other types of retail (and even wholesale and warehouse) product storage spaces.

The store station 14 preferably includes a telephone for interactive communication with the central station 10, and may also include a facsimile machine for creating hard copies of records. Optionally, the store station 14 may include a secondary processing means (e.g., the microprocessor of a computer), optionally equipped with a printer, for storing some database information such as, for example, a store setup program indicating the system options employed by the particular store and physical layout of product items in the particular store.

A significant feature of the invention is an order fulfillment system that provides an interactive order assembly or fulfillment process. The preferred system permits interactive communication between a directing station 32 (e.g., the central or, optionally, the store station) and the person (or "shopper") assembling an order. (The directing station and the store station may be located relatively physically close to each other, even within the same building.) The order assembly shopper is generally an employee of the particular store but could be a store customer needing information about product locations in an unfamiliar store.) The store station 30 receives order fulfillment instructions from the directing station 32 and the shopper is able to respond to and provide the directing station with information based upon actual shelf (e.g., inventory) conditions at each particular store served by the system. Preferably, the order fulfillment instructions are arranged and issued to the order assembly shopper in a manner permitting efficient movement about the layout or floor plan of the particular store in which the order is being assembled. Ideally, in issuing the order assembly instructions, the directing station 32 directs the physical movements of the order assembly personnel in the store in a sequence that moves the shopper about the store in a highly efficient manner (e.g., without requiring backtracking or repeated trips through an aisle) so that less employee time is required to assemble an order. Also, the system has the capability to issue instructions for assembling more than one order at a time, providing even greater efficiency in the order fulfillment process, and directs the assembly of the individual orders as the products are being picked from the shelves of the store.

A significant feature of the invention is that the store station includes a wireless directing apparatus 30 employed with the order fulfillment system to permit fast and unencumbered movement of the order assembly person (e.g., the "shopper") within the product storage space of a store while permitting interactive communication between the directing station 32 and the order assembly shopper while one or more orders are being assembled by the shopper. The wireless directing apparatus 30 comprises a base station 34 and a portable station 36 which are capable of wireless communication therebetween. The base station 34 is preferably locatable in or at least within wireless transmitting distance of the store building in which the orders are to be assembled (although this could range to several hundred feet or more). The portable unit 36 is preferably totable (and ideally wearable) by the order assembly shopper without occupying both hands of the shopper, and ideally is completely "hands-free", such that neither hand of the shopper is prevented from gripping on product items.

The most preferable wireless directing apparatus 30 includes a wireless telephone device for use in a building, such as a "cordless" telephone device (e.g., an in-building wireless communication apparatus or "cordless telephone") which includes a telephone base unit 34A in the base station and a telephone portable unit 40 in the portable station 36. Each unit 34A, 40 has wireless transmitting and receiving capabilities therebetween. "Cordless telephone devices" as used herein is intended to include wireless telephone transmitting devices that are suitable for use inside (and even outside) of a building. The telephone base unit 34A may be connected to the directing station 32 though a telephone company-operated telephone line that is connected to the directing station (e.g., a distant central station), although a more direct networked connection may be used. Preferably, the telephone base unit 34A is essentially directly connected by a telephone line-emulating device (e.g., a "skutch" box) to the analog telephone interface device of the store (or even central) station computer.

Ideally, telephone base unit 34A and telephone portable unit 40 of the cordless telephone device are of the type operating on a 900 Megahertz or greater spread spectrum frequency band for maximizing the range between the base and portable units, and for minimizing interference in transmission between the base and portable units, especially within the interior of a building. Optionally, the portable unit may comprise a portable telephone employing longer range radio transmissions, such as a cellular telephone that is dialed into the telephone line interfaced with the directing station (e.g., its computer).

The portable station 36 preferably comprises an interface device 38, and a headset 39 that is connected to the interface device 38 and that is wearable on the shopper's head for hands free use. The headset 39 preferably includes an earphone or speaker for generating audible sounds from electronic sound signals and a microphone for receiving sounds and converting the sounds into electronic sound signals.

The portable station 36 also includes data entry means preferably comprising a bar code scanning device 37 of the type for reading standardized bar codes such as "Universal Product Codes" (or "UPC") and other inventory tracking and identifying indicia. The bar code scanning device 37 may comprise any type of scanner utilizing, for example, lasers or electrical sensors employing indirect or direct contact scanning, in the forms of "guns" or "wands" (or even glove-mounted scanners which project light from a position adjacent the wrist of the user), including those that are brought into contact with the indicia or swiped along the surface on which the indicia is printed. The optical scanner device 37 is also interfaced to the interface device 38, which converts the digital signals representing a "UPC" indicia into a DTMF representation of the UPC symbol. The portable station 36 also includes a power source (not shown) preferably comprising a battery, ideally of the rechargeable type.

A highly preferred component of the portable station is the portable interface device 38 which links together the various other components of the portable station and performs conversion of digital data signals into DTMF-encoded signals for transfer to the base station, and conversely performs conversion of DTMF-encoded signals from the base station into digital data signals for transfer to various components of the portable station, such as, for example, the scanning means. The portable interface device preferably includes a first interface means for interfacing to the second transceiver means (e.g., the telephone portable unit 40) of the portable station. The device also includes a second interface means for interfacing to the sound receiving means and the sound generating means of the portable station. A third interface means for interfacing to the scanning means of the portable station is also included in the device 38. The device 38 also includes a detection means connected to the first interface means for detecting the presence of DTMF-encoded signals in the stream of signals being received by the first interface means from the second transceiver means of the base station. The detection of DTMF tones by the detecting means triggers an interrupting means connected to the first interface means which acts to preventing the DTMF-encoded signals from being transferred to the sound generating means connected to the second interface means so that the user of the portable station is not subjected to hear DTMF tones which are intended for interpretation by the components of the portable station and are essentially meaningless to the user. A translating means is also included in the portable interface device 38 for converting digital data signals received from a scanning means (and any other digitally-communicating device of the portable station) interfaced to the third interface means. The translating means is adapted to convert digital data signals into DTMF-encoded transfer signals and transmit the transfer signals to the first interface means for transfer to the base station 34. Further, the translating means converts DTMF-encoded transfer signals received by the first interface means of the device 38 from the second transceiver means. The translating means are adapted to convert the DTMF-encoded transfer signals into digital data signals for transfer to various components of the portable station, such as, for example, the scanning means.

Significantly, the most preferred wireless directing apparatus of the invention transmits information between the base station 34 and the portable station 36 in an encoded form as voice signals and DTMF-encoded signals, without any conversion of signals into computer command codes performed by the portable station. Advantageously, the system of the invention performs the voice recognition function and the DTMF-encoded signal conversion function (into computer command codes for the directing station) at the central or base station (and not in the portable station), which permits the addition or deletion of system functions at the central or base station. Thus, the voice recognition means is located in the base station or in the directing station, and not in the portable station, and voice commands of the customer order "shopper" are not converted to computer command codes until the voice signals reach the base station or central station. This configuration eliminates the need to reprogram or reconfigure each individual portable station, which is especially beneficial when multiple portable stations are being used with the system.

Optionally, the order fulfillment station may comprise a facsimile machine capable of receiving and printing out a listing of the products of one or more order records transmitted by the central station, and preferably this listing would be in an order reflecting the arrangement of products in the aisles and on the shelves of the particular store in which the order is to be fulfilled. From this printed listing, the order assembly shopper may assemble one or more orders for store customers, although such an arrangement lacks an interactive nature provided by the interactive order fulfillment system of the invention.

A remote station may also be located at an order delivery service away from the store station to provide notification to the delivery service of any orders to be delivered to the customers of a store.

System Communication Procedures and Processes

Figure 4:
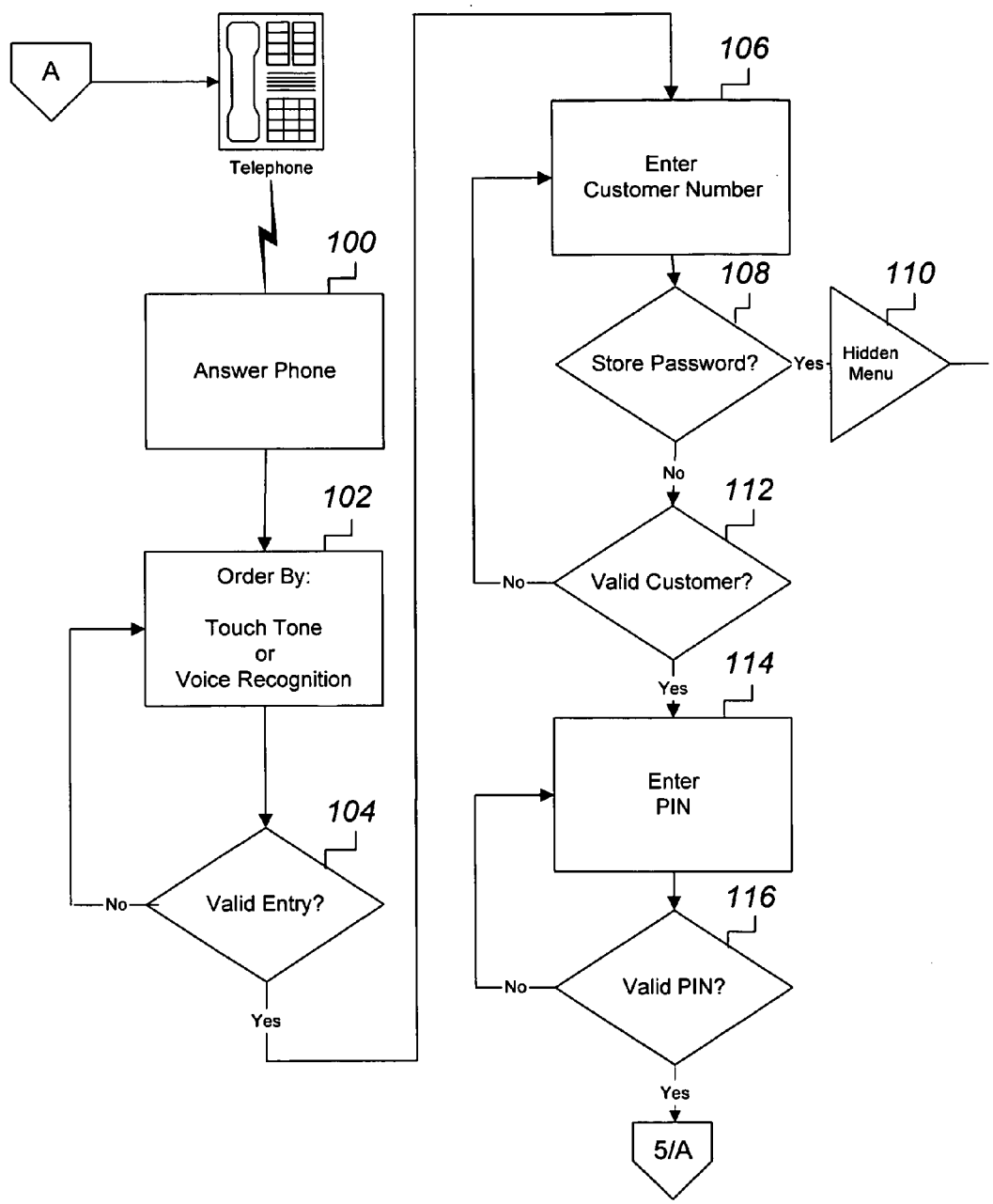
FIG. 4 is a schematic flow diagram of the remote station identification process of the order creation procedure of the present invention.
Figure 5:
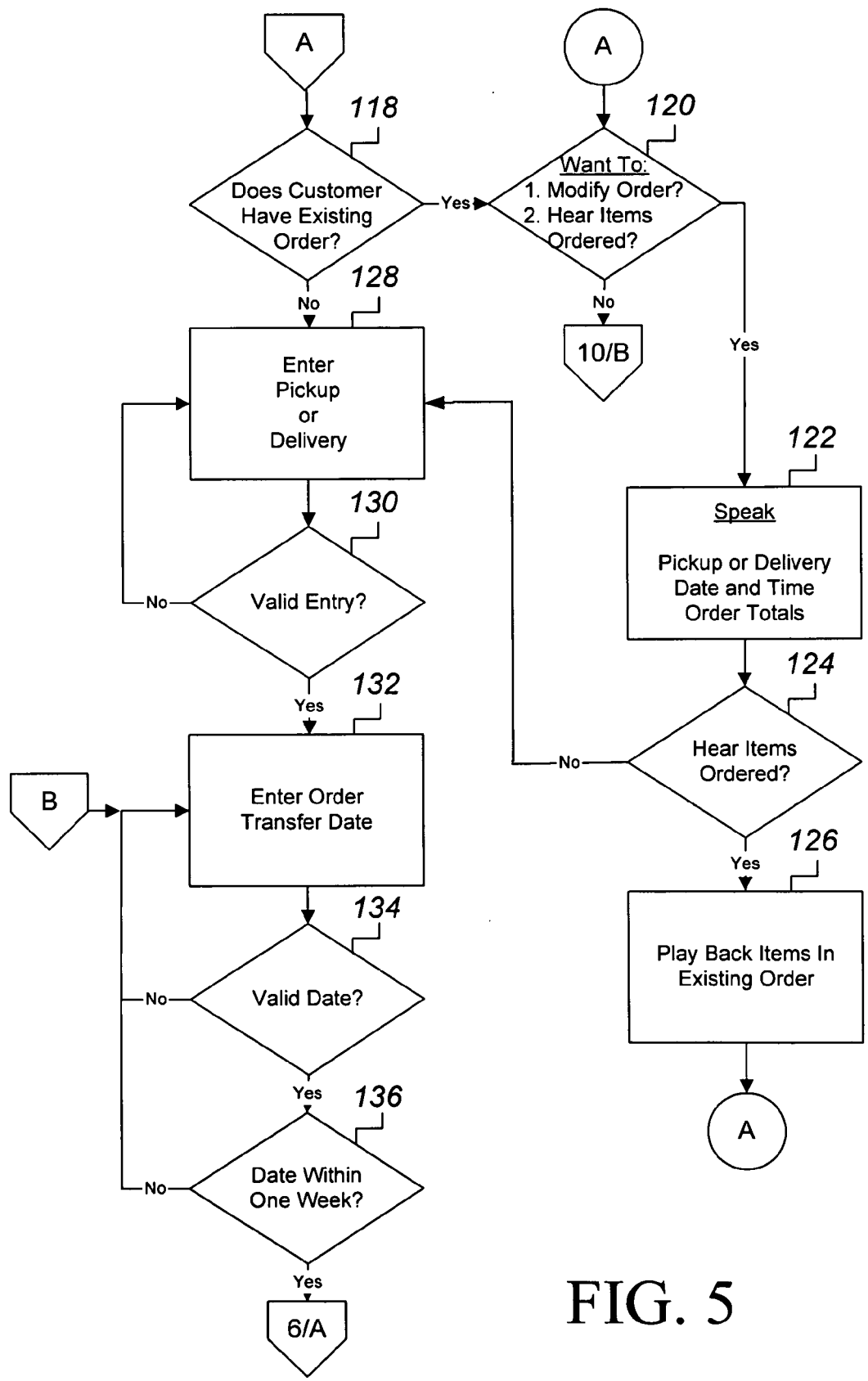
FIG. 5 is a schematic flow diagram of the pending order status process of the order creation procedure of the present invention.
Figure 6:
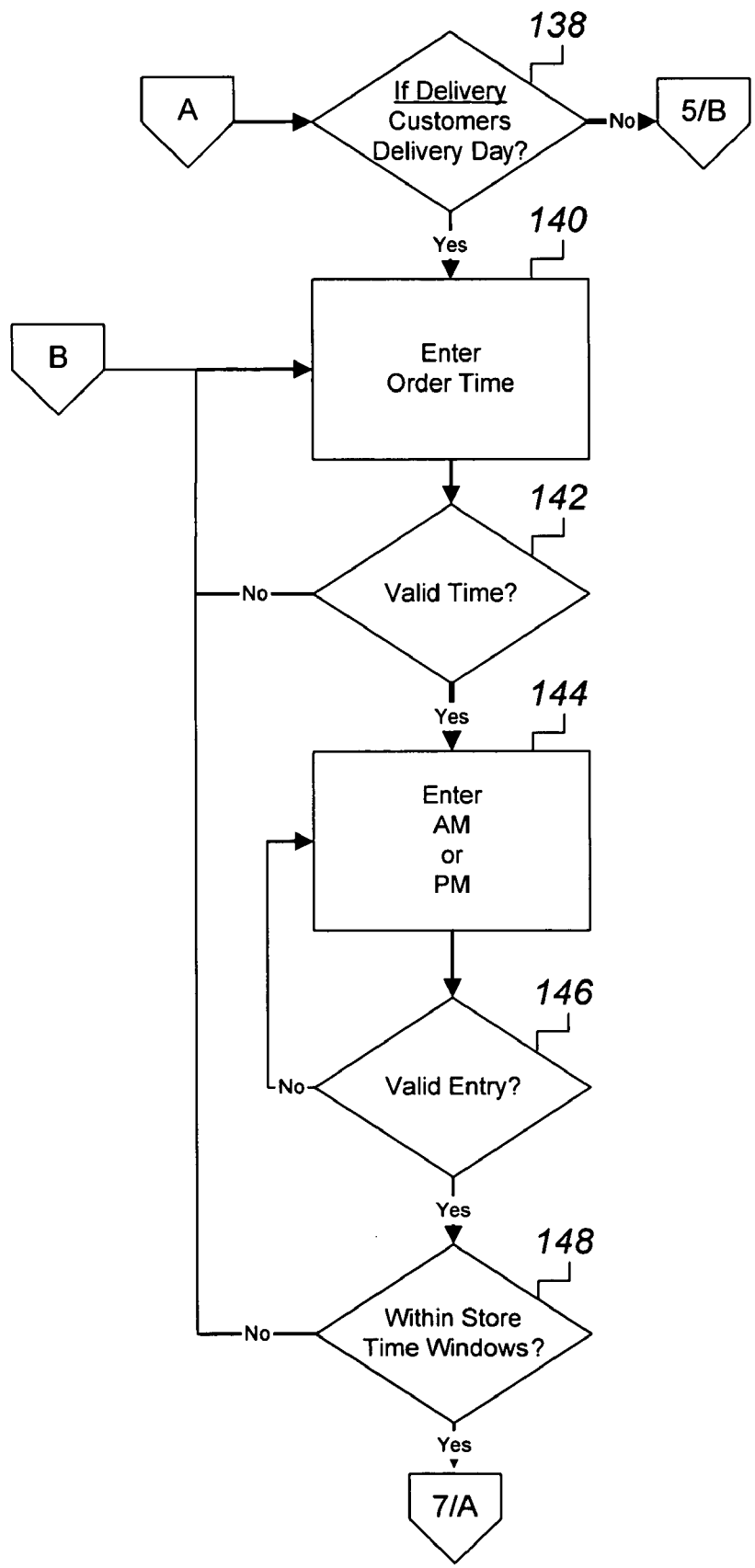
FIG. 6 is a schematic flow diagram of the order transfer characteristic selection process of the order creation procedure of the present invention.

As diagramatically represented in FIG. 4, a remote access station initiates a communication with the central station by opening a communication (e.g., telephone) line to the analog or digital telephone interface of the central station. The central station answers the phone by opening up the telephone line through the telephone interface device (action 100). The central station (action 102) transmits a menu to the remote station (preferably by transmitting a prerecorded voice reciting the menu options) and prompts the remote station to select the desired mode of communication, such as DTMF tones or voice communication.

The remote station responds to the menu prompt, and the central station determines (at test 104) if the response by the remote station is a valid entry (i.e., one of the options offered in the menu). If the response is not recognized as a valid entry option, the central station retransmits the communication mode options menu (action 102) to the remote station. If the response is valid, the central station proceeds with the remote station identification validation process.

The central station transmits a request (action 106) for the customer's identification code, preferably a "customer number". When a response from the remote station is received, the central station determines (test 108) if the response is a predetermined authorized access code (e.g., a "store password") that permits the remote station to have an expanded level of access authority to the central station and the database. If an acceptable predetermined authorized access code is received by the central station, the remote station is permitted access to an authorized access menu (transfer 110) of expanded access options (see FIG. 12) which is preferably hidden from a remote station which has not presented the predetermined authorized access code.

Customer Order Creation Procedure

If the predetermined authorized access code was not transmitted to the central station (action 106) by the remote station, the response from the remote station is checked (at test 112) against the database of customer numbers to determine if the response is a valid customer identification code, or "Customer Number". If the response is not a valid customer identification code, the remote station is reprompted to transmit or enter a customer identification code (action 106). If a valid customer identification number has been transmitted by the remote station, the central station prompts the remote station to transmit a predetermined confidential customer code, such as a "Personal Identification Number" (or "PIN"), to permit continued access to the central station. The response from the remote station is compared (test 116) to the valid confidential customer code, or PIN, contained in the customer profile record associated with the customer identification code transmitted earlier (e.g., at action 106). If the PIN response is not valid, the customer is reprompted to enter the correct PIN (action 114). If the PIN response is valid, the central station proceeds to the pending order status process (see FIG. 5).

Pending Order Status Process

Upon completion of the remote station (or "customer") identification process, the central station determines (see FIG. 5) if the customer account record has one or more pending or existing order records that has not been assembled or fulfilled (test 118). If a customer account has one or more existing unfulfilled order records, the central station transmits a prompt to the remote station inquiring whether the customer desires a listing of the products in the existing order records, or if the customer would like to modify any existing orders (test 120). If the customer does not, the central station transmits (action 266 in FIG. 10) a courtesy message (e.g., thanking the customer), and the access session is terminated (termination 268) by a closing, or "hanging up", of the phone line. If the customer responds positively to either of these options in this query (test 120), the central station transmits (action 122) the previously selected order characteristics of the transfer of the order (characteristics such as whether the order is to be delivered or picked up, the date and time of the delivery/pickup, and the total cost of the existing order). If the customer has indicated that a listing of the products in the existing order should be recited (test 124), the store station transmits (e.g., by voice) a recitation of the products in the existing order (action 126) and the customer is returned to the earlier inquiry (test 120). Optionally, the recitation of order items could be performed when any of the options is selected.

Order Transfer Characteristic Selection Process

If the central station determines that there is no preexisting order record or records on the database for the customer's account (test 118), or if the customer has indicated (test 124) that no listing of the products of a preexisting order is desired, the customer is prompted (action 128) to choose between the available order transfer characteristic options. In the most preferred embodiment of the system, at least two transfer options are available, including "customer pickup", wherein the products of the order are transferred to the customer at the store location, and "delivery", wherein the products of the order are to be transferred to the customer at a location (selected by the customer) away from the store. The customer response is tested for validity against the available options (test 130). If an invalid response is detected, the customer is reprompted (action 128) to select the desired transfer option.

If the transfer option response is valid, the customer is prompted to enter or transmit the desired order transfer date (action 132). The customer's response is tested by the central station to determine if the entered transfer date is in the form of a valid date (test 134). If not, the customer is reprompted for an order transfer date (action 132). If the desired order transfer date is valid, the order transfer date is tested to determine if the date is within a predetermined time period in the future (e.g., a week period) from the date the order creation procedure is occurring. If not, the customer is reprompted to enter a desired transfer date (action 132). If the desired order transfer date is within the predetermined period, the central station proceeds (to test 138 of FIG. 6).

Optionally, the order delivery area may be divided into individual zones in which deliveries are made to customers residing in a particular zone only on selected days of the week. If this option is activated in the store setup program on the system, and if the transfer is to be a delivery, the central station determines (see FIG. 6) whether the transfer date is a valid delivery date in the delivery zone in which the customer resides (test 138). If not, the customer is reprompted to enter an order transfer date (action 132). If so, the central station prompts the customer to enter a desired order transfer time for the order (action 140). The central station determines (test 142) whether the desired transfer time is a valid time entry (e.g., fitting the format 00:00). If the time is not valid, the customer is reprompted to enter an order transfer time (action 140). If the time entered is valid, the customer is prompted to select between "AM" and "PM" to further indicate the desired order transfer time earlier entered (action 144). The customer's response is then tested for validity (test 146), and if not, the customer is reprompted (action 144). If the response is valid, the (entire) desired order transfer time is checked (test 148) to determine if the time is within the store's time windows of operation (e.g., during the hours in which the store is open for business). If not, the customer is reprompted (action 140) to enter a new order time. If so, the central station determines (test 150 in FIG. 7) whether the time period between the time of taking the order (i.e., the current time) and the customer's desired order transfer time is sufficiently long to assemble or fulfill the order (i.e., whether the time period is greater than a minimum predetermined order assembly time period). If not, the customer is reprompted to enter a new order transfer time (action 140). If the time period is sufficiently long to assemble the order, the central station proceeds with the order product entry process.

Order Item Entry Process

Figure 7:
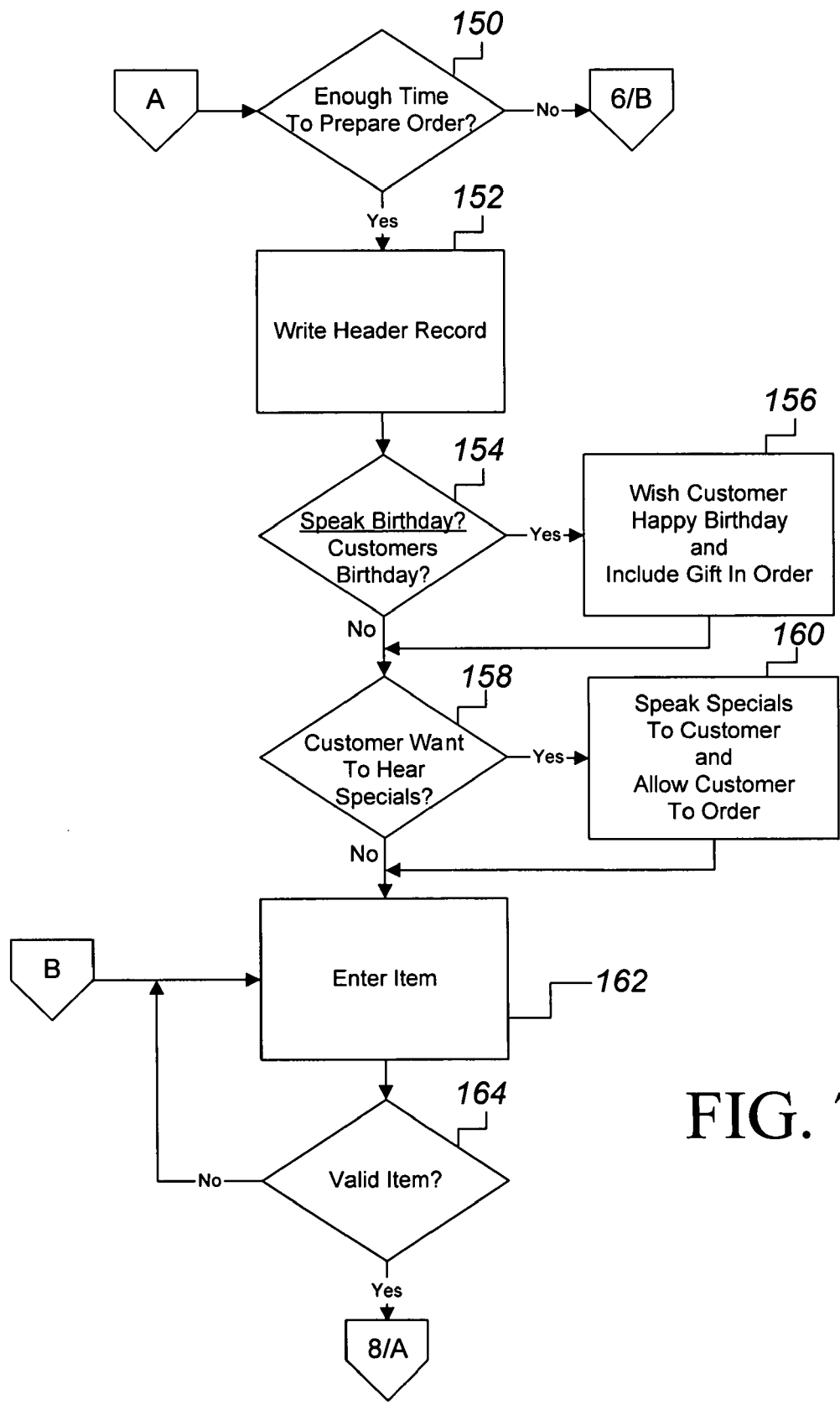
FIG. 7 is a schematic flow diagram of the order item entry process of the order creation procedure of the present invention.
Figure 8:
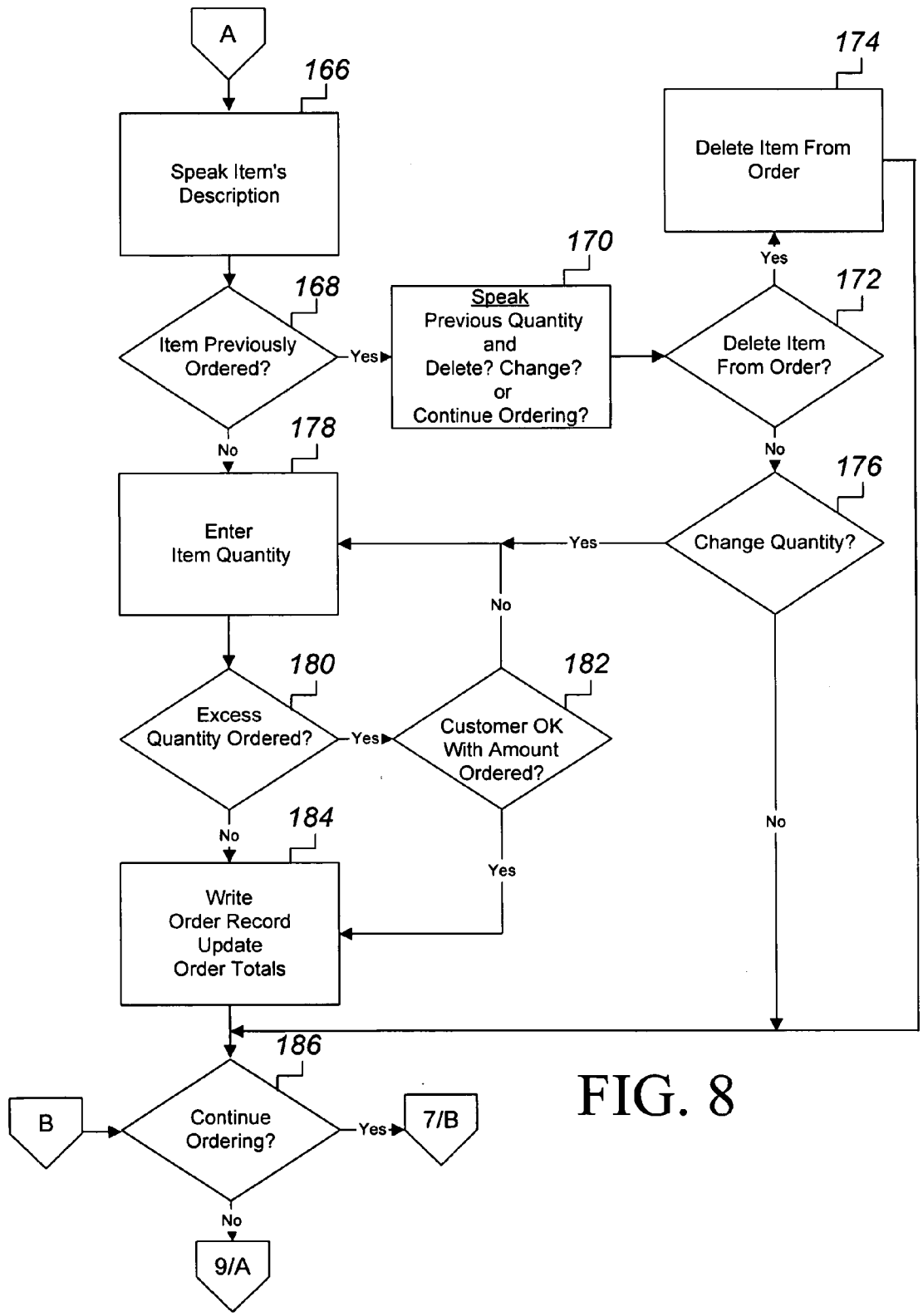
FIG. 8 is a schematic flow diagram of the order item entry process of the order creation procedure of the present invention.

If the central station determines that there is sufficient time to assemble an order before the desired transfer time, an order record is initiated (action 152) by writing a header record in the database (see FIG. 7).

In a preferred feature of the invention, the customer's birthday (stored in the customer profile record) is compared (test 154) to the current date or, preferably, a predetermined range of dates following the current date, such as, for example, the following seven days. If the customer's birthday is within the predetermined range of days, a prerecorded voice message may be employed to wish the customer a "Happy Birthday" and may inform the customer that a gift will be included in the order to be assembled (action 156).

In another preferred feature of the invention, the central station inquires whether the customer wants to receive a recitation of the products on which there are currently a special offer (e.g., special pricing). If the customer responds positively (test 158), a prerecorded voice announces the special offers, and the customer is permitted to order one or more of the special products (action 160).

The customer is prompted to enter (or speak) a product that is to be included in the order (action 162). After the customer responds with a product identification (e.g., such as a product name or product code selected from a store-distributed customer catalog), the central station determines (test 164) whether the product name or code entered by the customer is a valid product code. If not, the customer is reprompted to enter a product code (action 162). If the product code is valid, a prerecorded product description and product price message (corresponding to the product code) is transmitted to the customer (action 166) identifying the product ordered (see FIG. 8). The central station determines (test 168) whether the product entered by the customer is also part of a preexisting order that has not been fulfilled. If not, the customer is prompted to enter the quantity of the product desired (action 178). If the product is part of a preexisting order for the customers account, the central station informs (e.g., by voice) the customer of the quantity of the product previously ordered.

The customer is then preferably presented with a menu of choices including whether the customer would like to: 1) delete the product from the order, 2) change the quantity of the product in the order, or 3) continue ordering (action 170). If the customer indicates the product should be deleted from the order (test 172), the product is deleted from the preexisting order record (action 174). If the customer indicates that he or she does not wish to delete the product from the order (test 172), but previously indicated a desire to change the quantity of the product ordered (test 176). If the quantity is to be changed, the customer is prompted (action 178) to enter a new quantity for the product.

Preferably, the customer is instructed at the initiation of the ordering process that the order item entry process may be terminated by the entry of a preselected signal, such as, for example, is generated by pressing the pound ("#") button on the telephone at the remote station. When the transmission of the preselected signal is detected by the central station (test 186), the order item entry process is ended and proceeds to the coupon entry process (test 236 of FIG. 9).

Preferably, the central station compares (test 180) the quantity of the product requested by the customer to a predetermined excess quantity that is entered in the particular store setup. If the requested quantity exceeds the predetermined excess quantity, the central station repeats the requested quantity and the customer is asked to confirm that the quantity requested is correct (test 182). If the customer indicates that the requested quantity is incorrect, the customer is prompted to enter a product quantity (action 178). If the customer confirms the requested quantity, or if an excess quantity was not detected initially (test 180), the central station writes an order record in the database (for which a header record was written in action 152) and updates the order totals (action 184). If the customer has not indicated (test 186) that he or she is finished with the order product entry process (e.g., the pound sign telephone key has not been pressed), the customer is again prompted (action 162) to enter a product identification (e.g., name or code).

In the most preferred embodiment of the system, during each successive pass though the order item entry process for each product, the voice queries posed to the customer become less detailed. The first time through the item entry process the queries posed by the central station are relatively detailed as to the options available to, and the response expected from, the customer, and on each successive pass the questions are less detailed as the customer gains experience with the order item entry process. Ideally, by the third pass the queries have become as minimized as possible.

Coupon Entry Process

Figure 9:
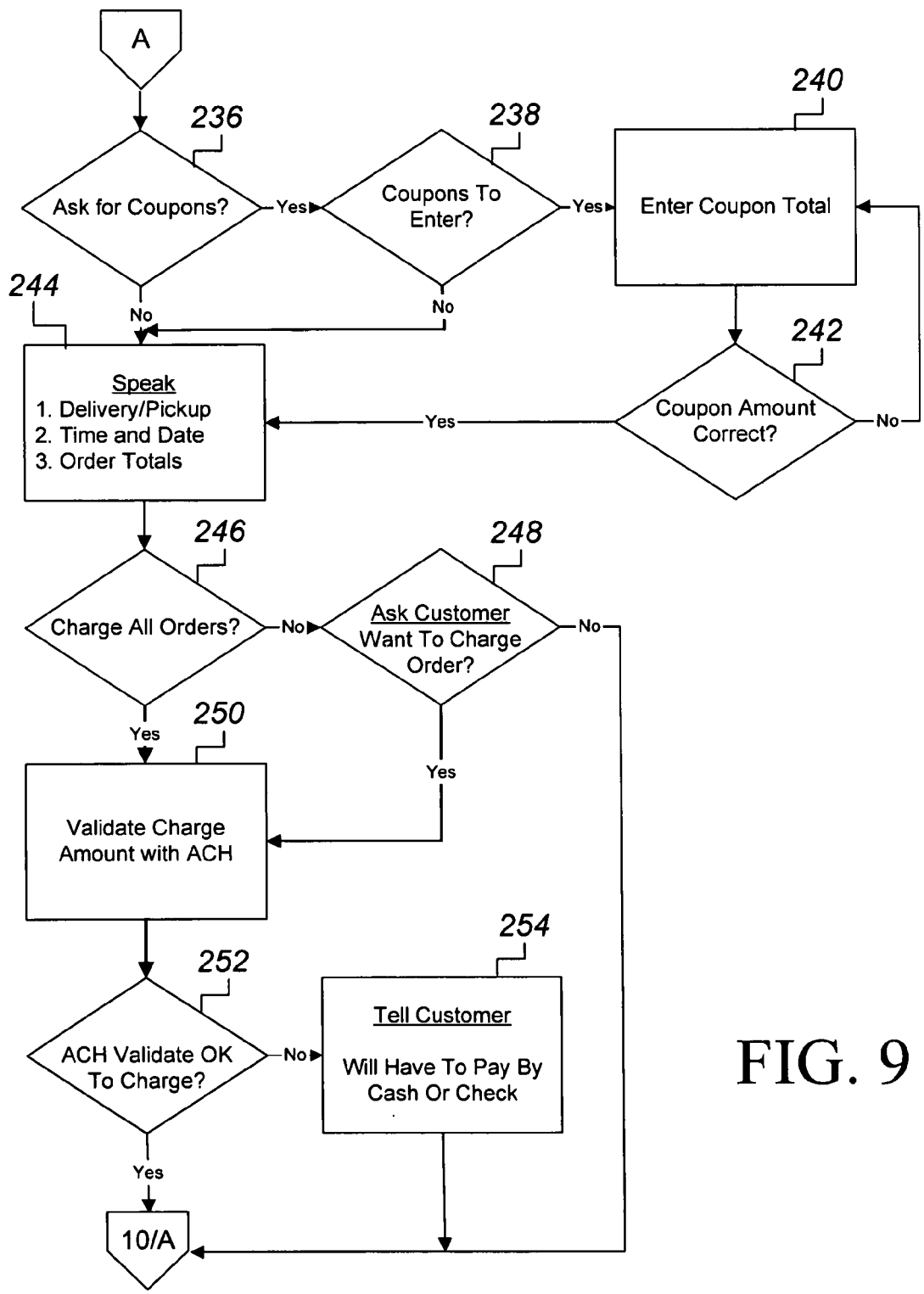
FIG. 9 is a schematic flow diagram of the coupon entry process and the payment option selection process of the order creation procedure of the present invention.
Figure 10:
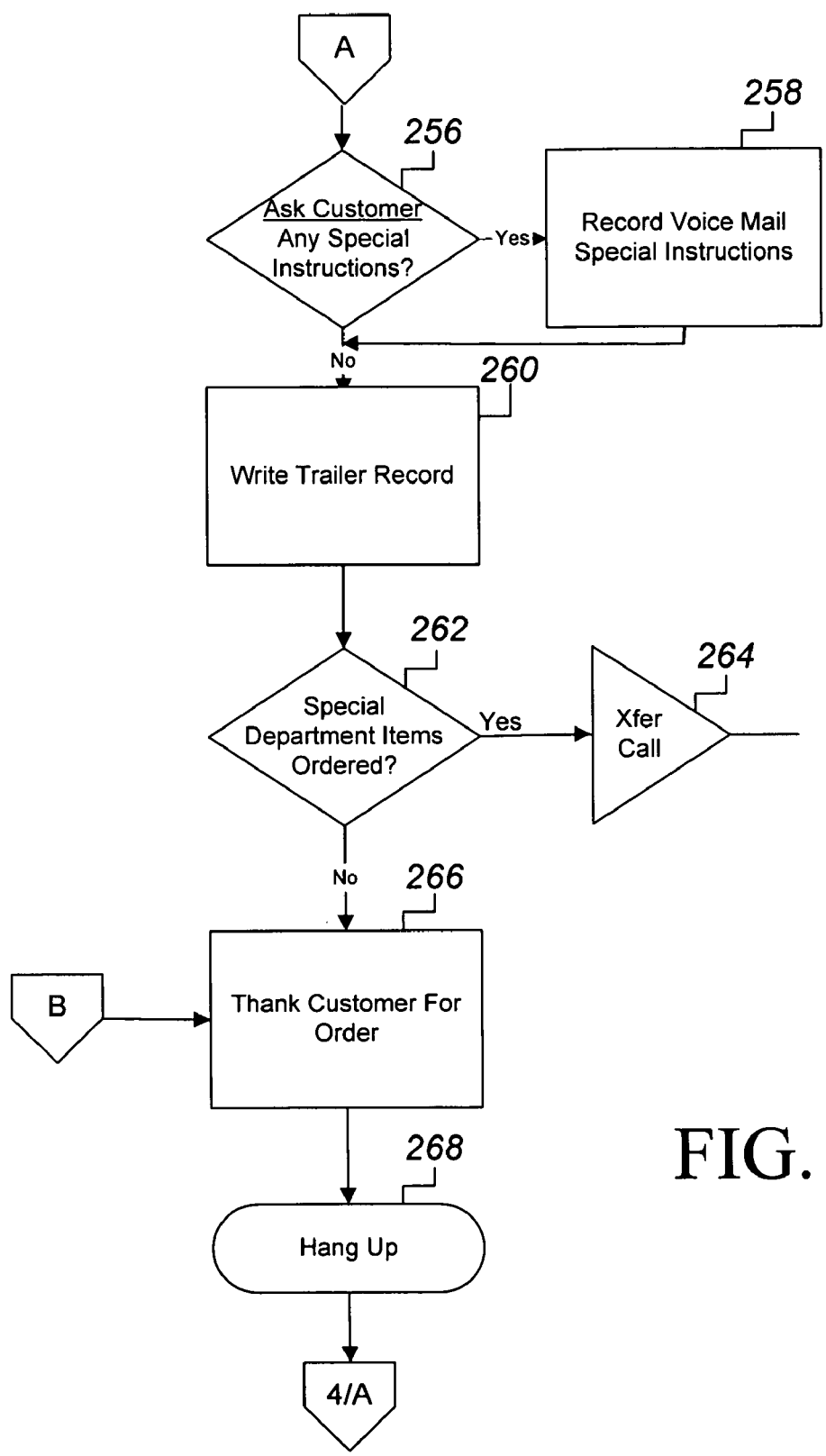
FIG. 10 is a schematic flow diagram of the special order instructions process of the order creation procedure of the present invention.
Figure 11:
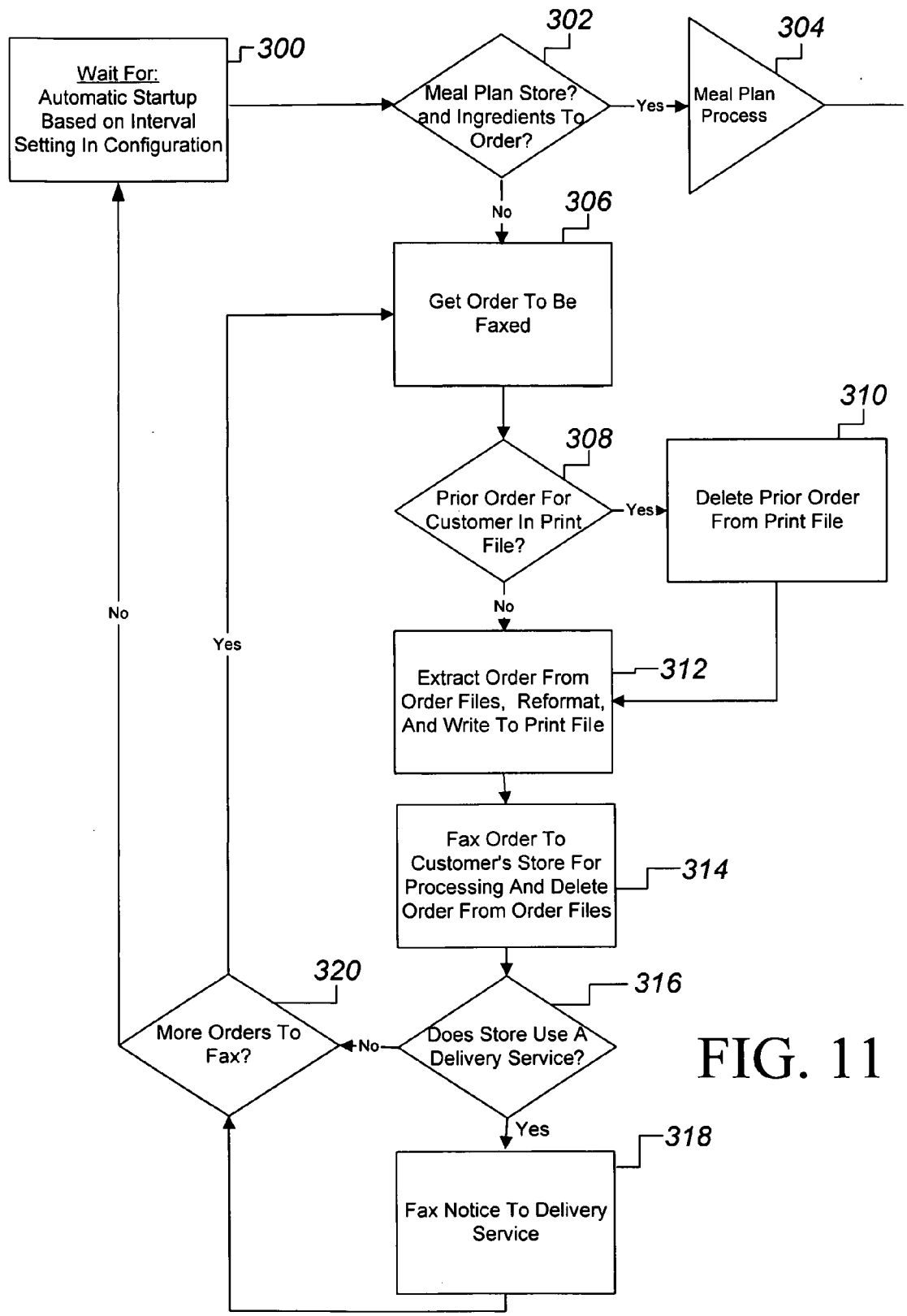
FIG. 11 is a schematic flow diagram of the order transmission procedure of the present invention.
Figure 12:
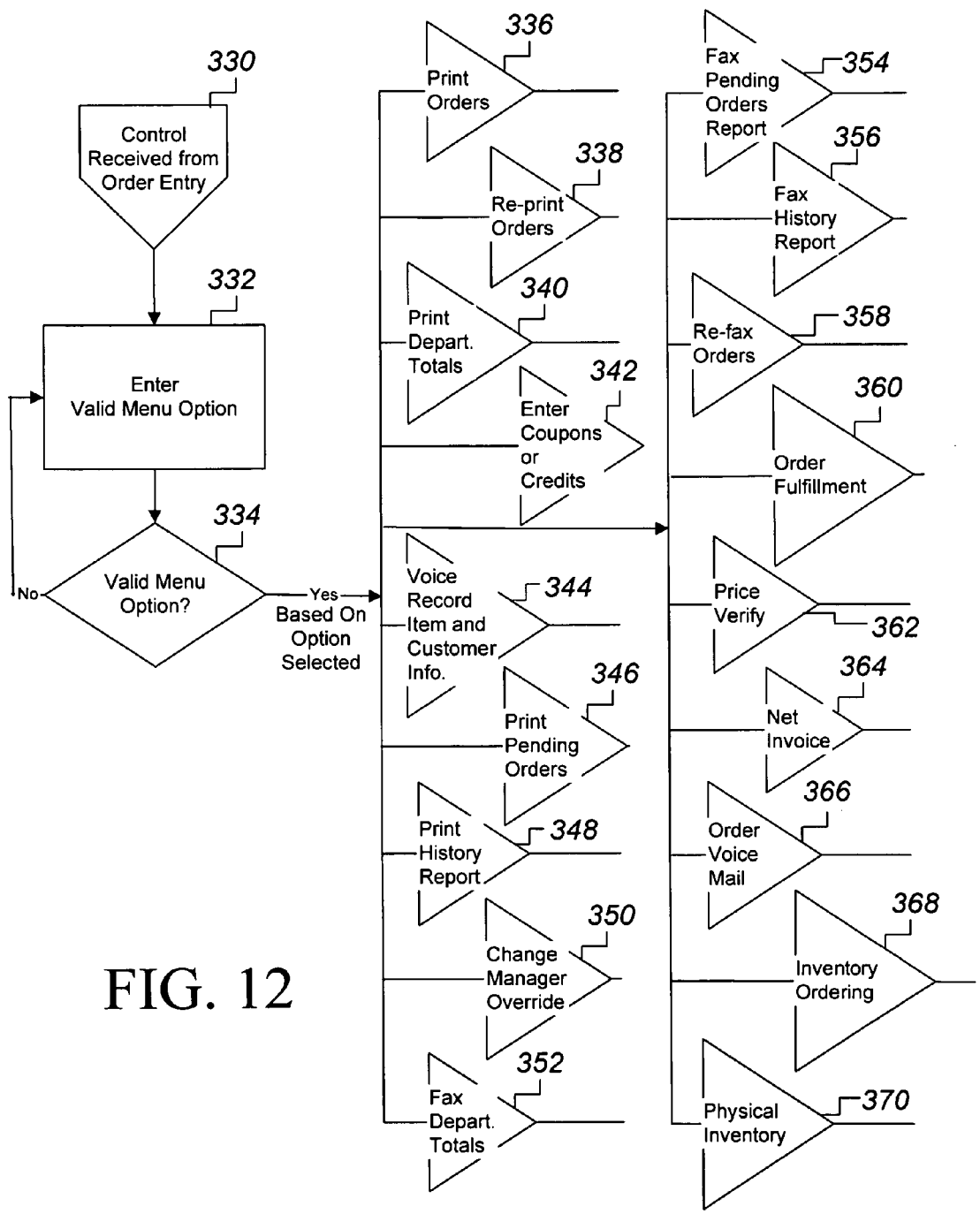
FIG. 12 is a schematic flow diagram of the hidden menu procedure of the present invention.
Figure 13:
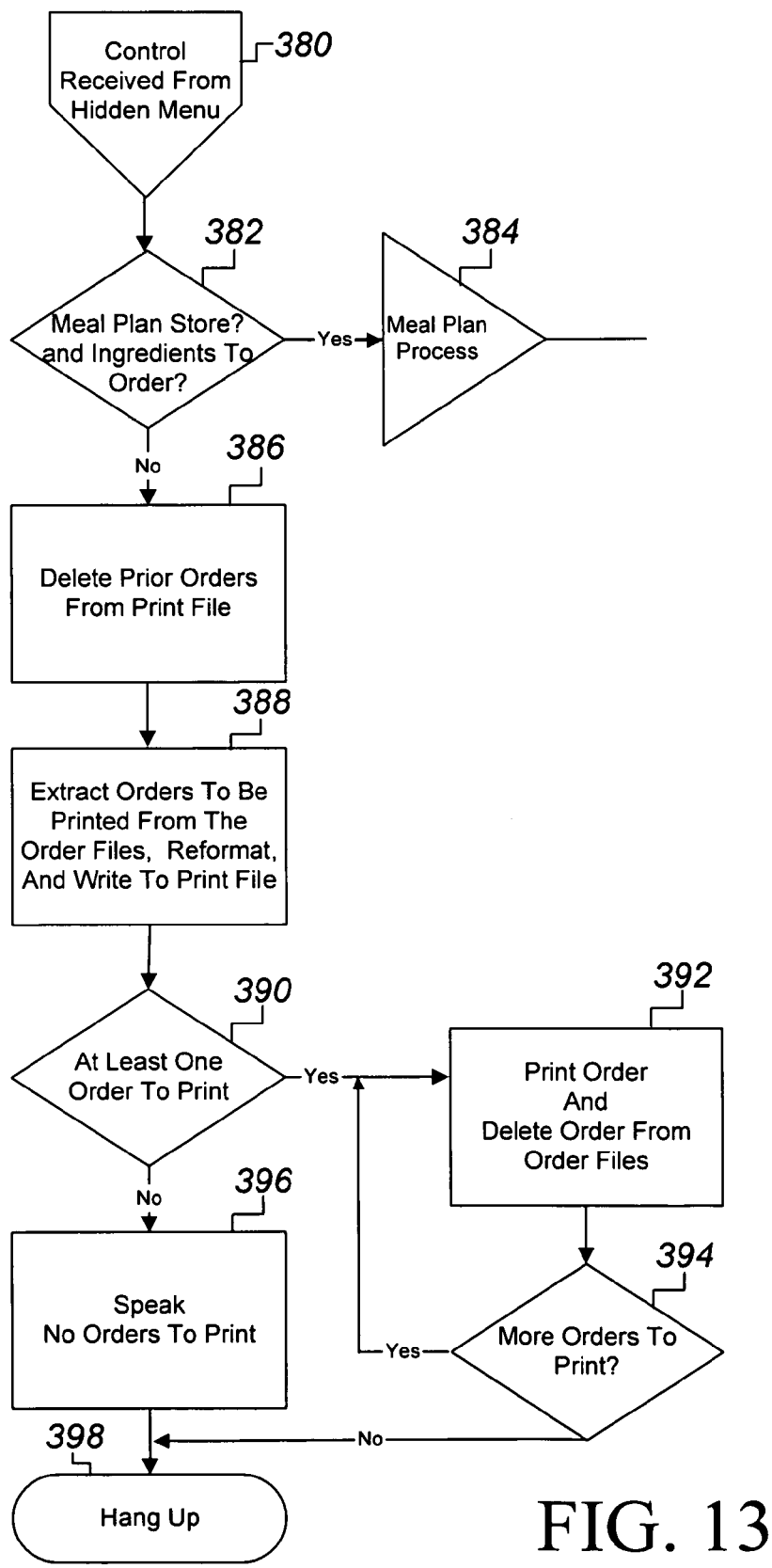
FIG. 13 is a schematic flow diagram of the print orders process of the present invention.
Figure 14:
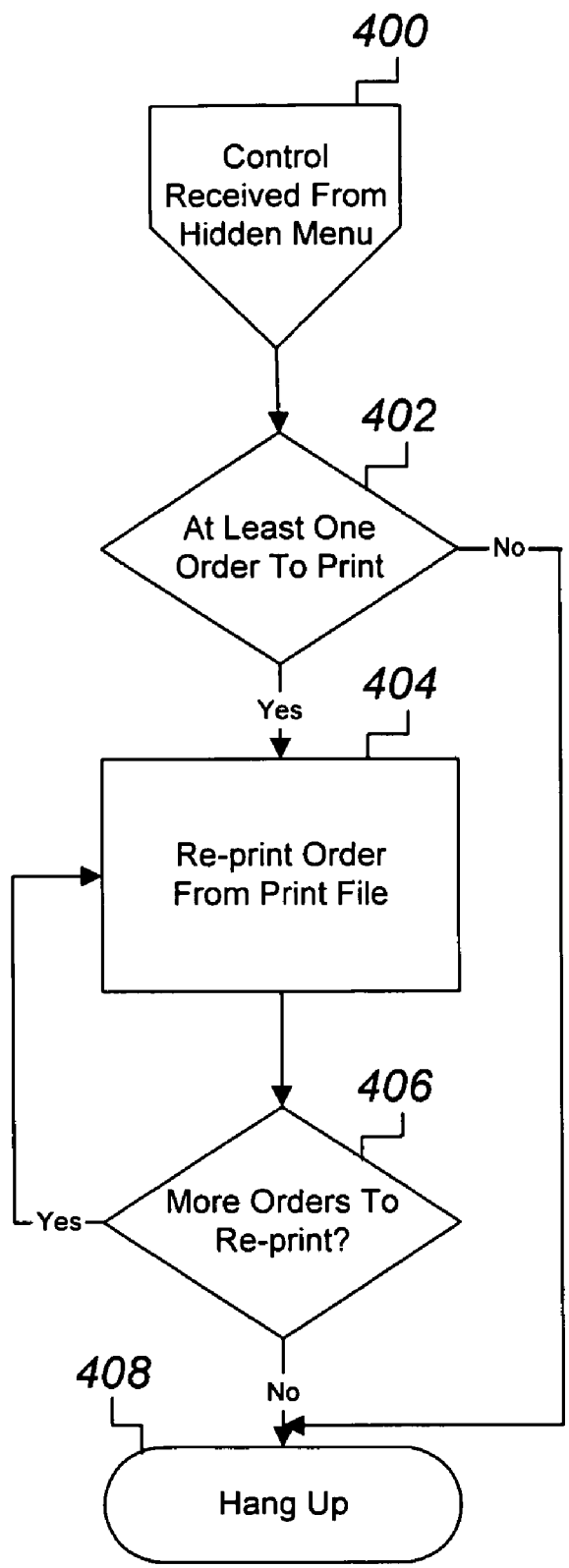
FIG. 14 is a schematic flow diagram of the reprint orders process of the present invention.
Figure 15:
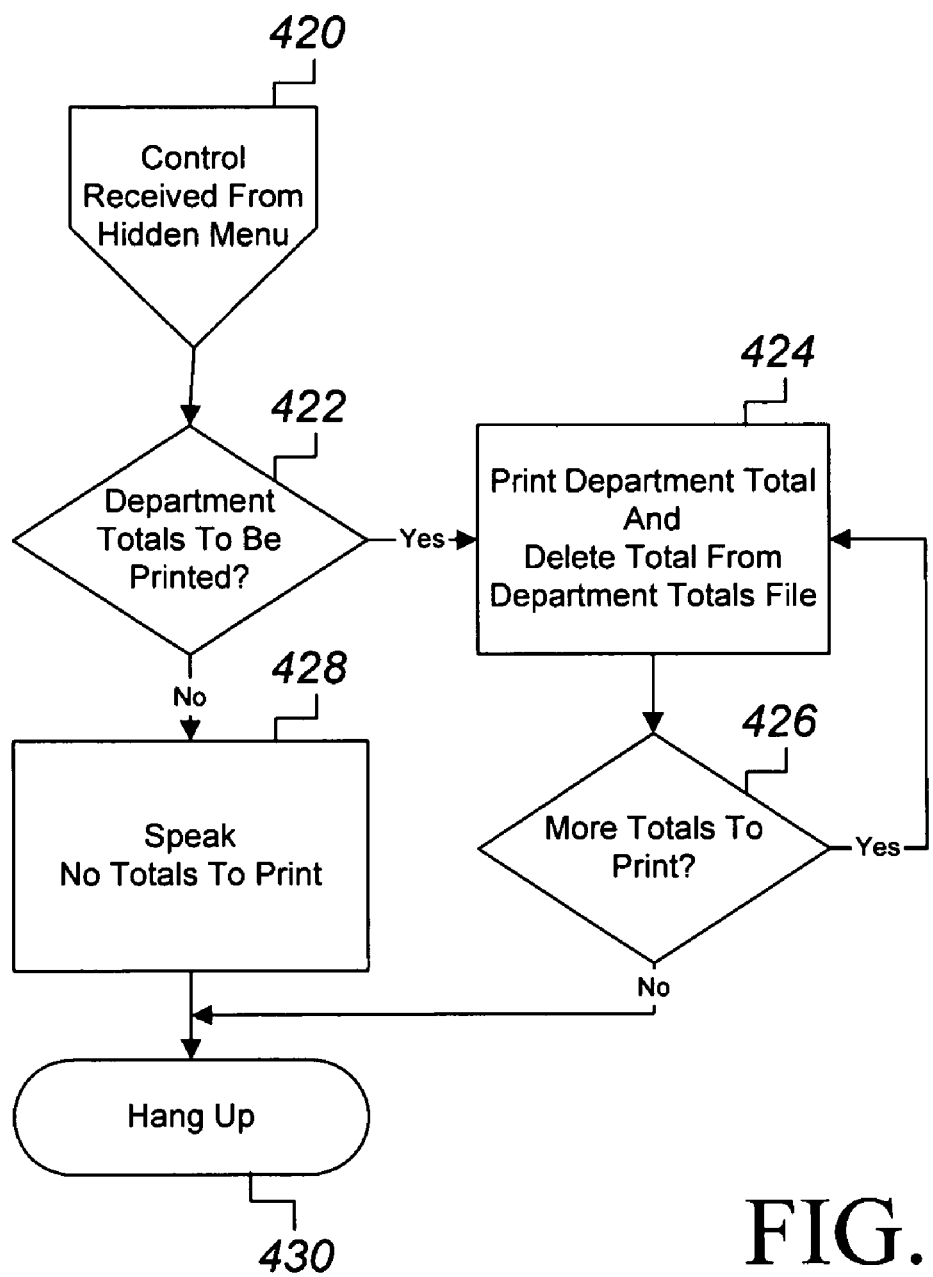
FIG. 15 is a schematic flow diagram of the print department totals process of the present invention.
Figure 16:
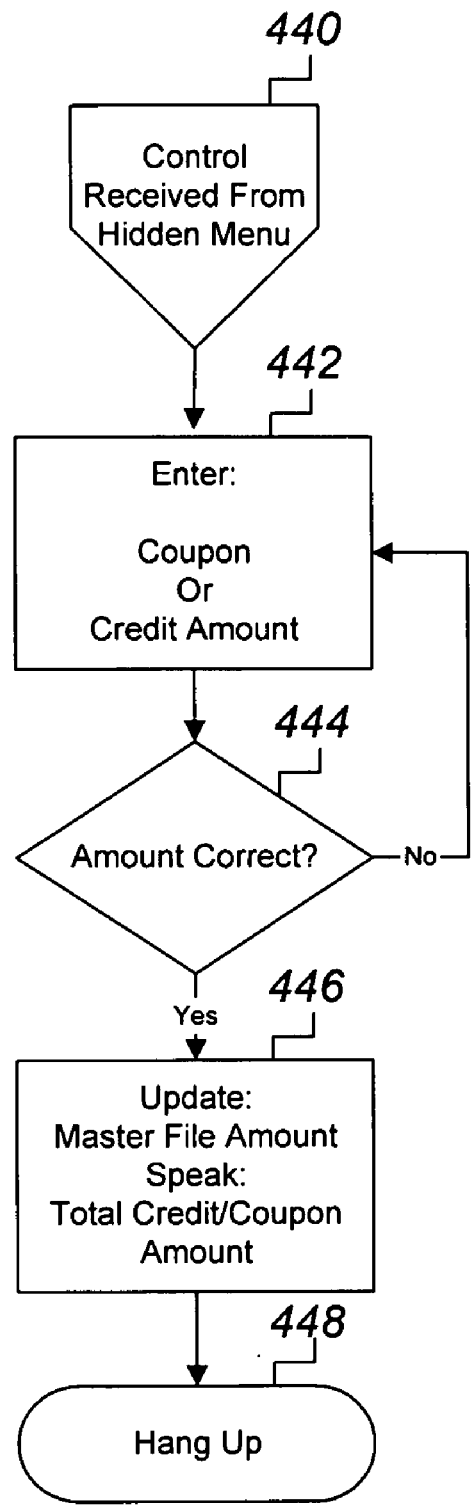
FIG. 16 is a schematic flow diagram of the enter coupon or credit amount process of the present invention.
Figure 17:
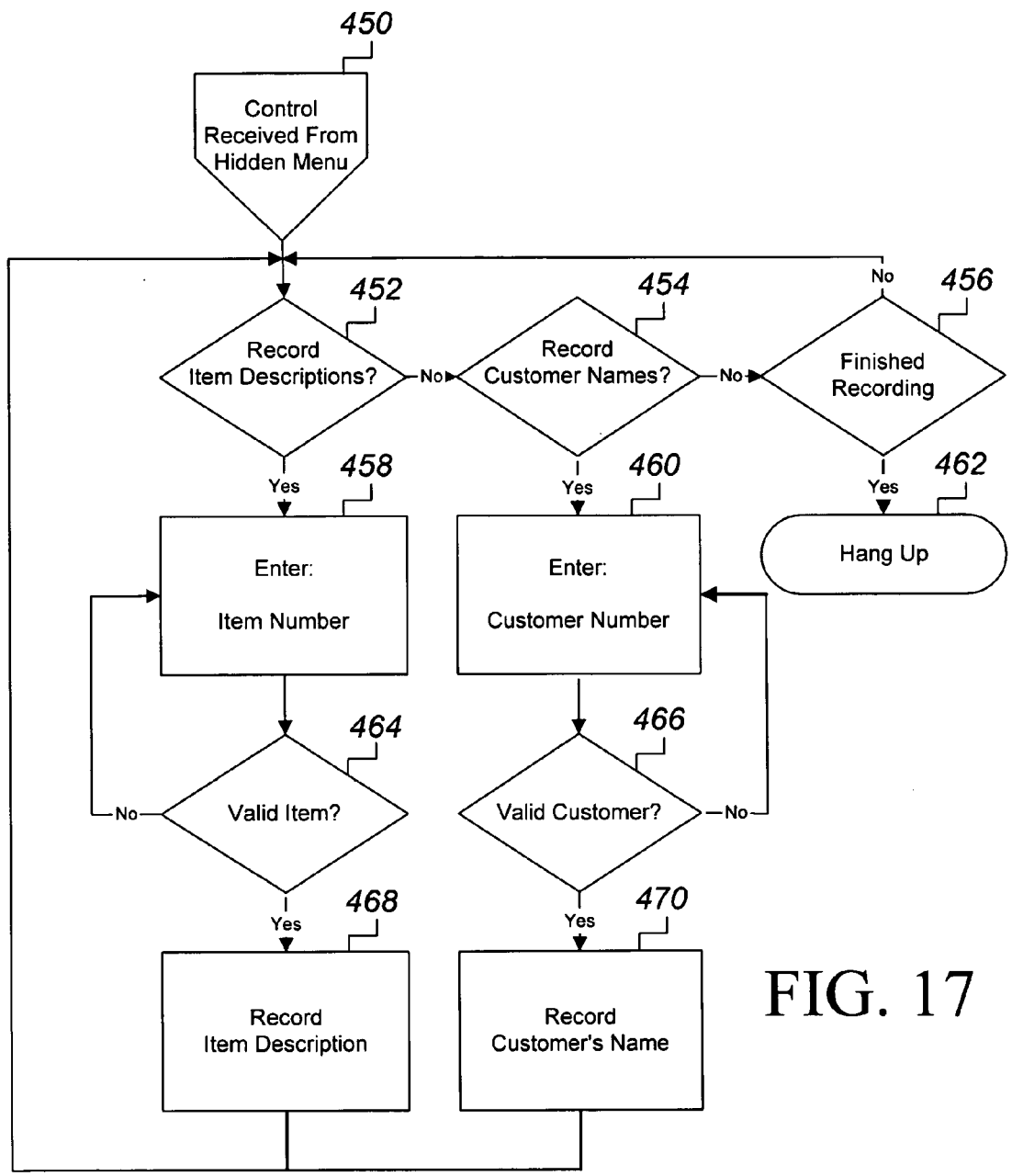
FIG. 17 is a schematic flow diagram of the record product descriptions or customer names process of the present invention.
Figure 18:
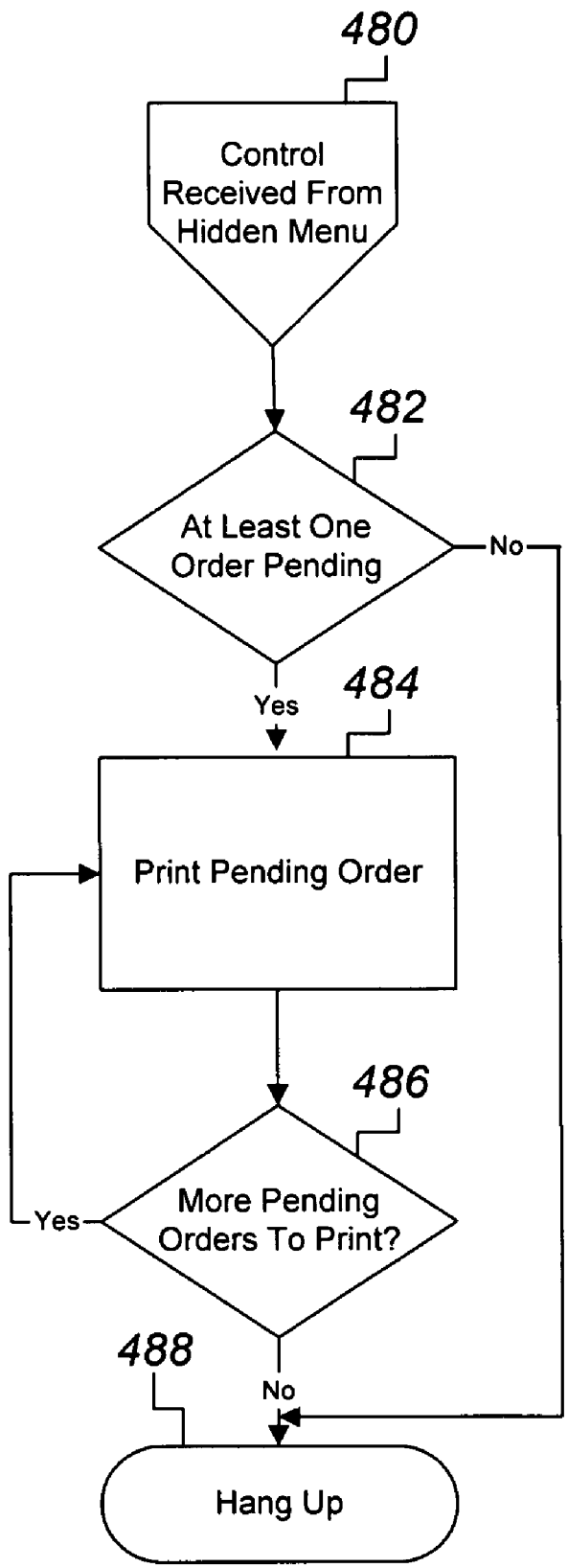
FIG. 18 is a schematic flow diagram of the print pending orders report process of the present invention.
Figure 19:
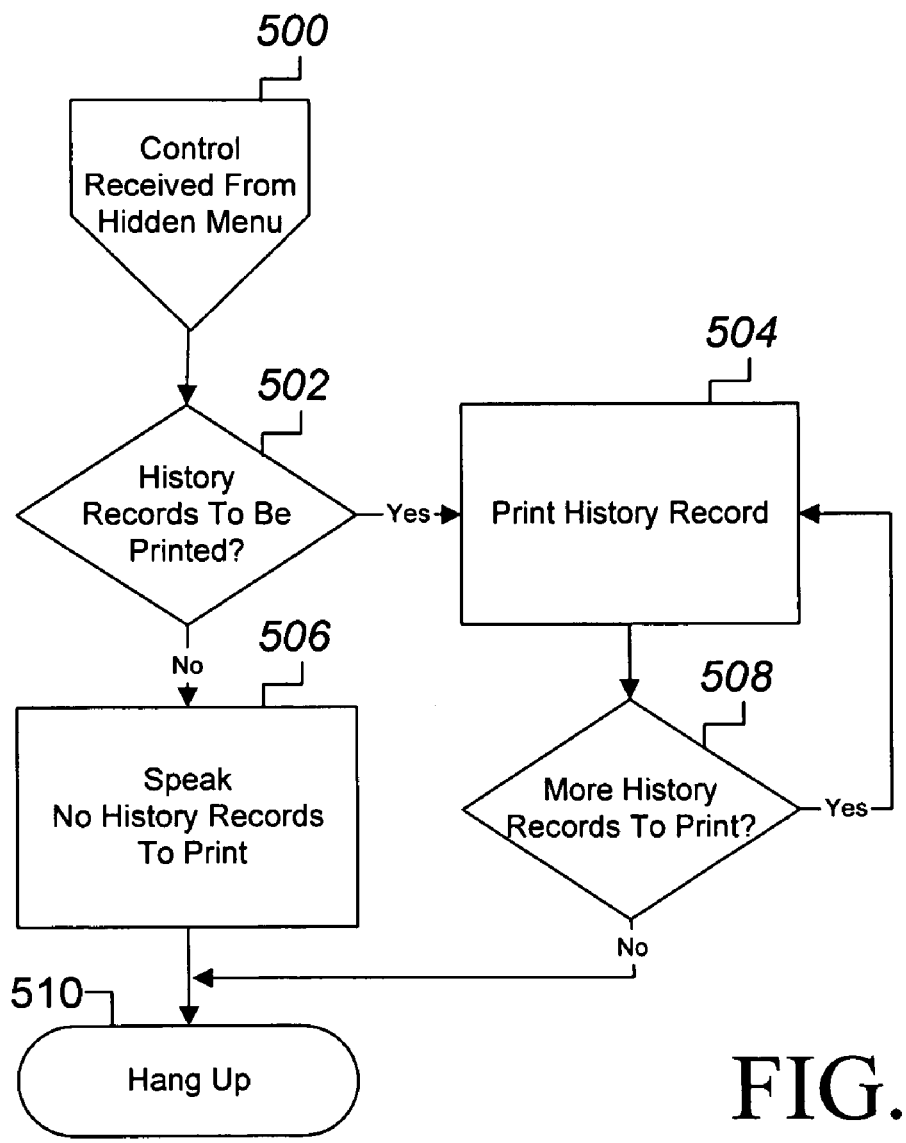
FIG. 19 is a schematic flow diagram of the print history report process of the present invention.
Figure 20:
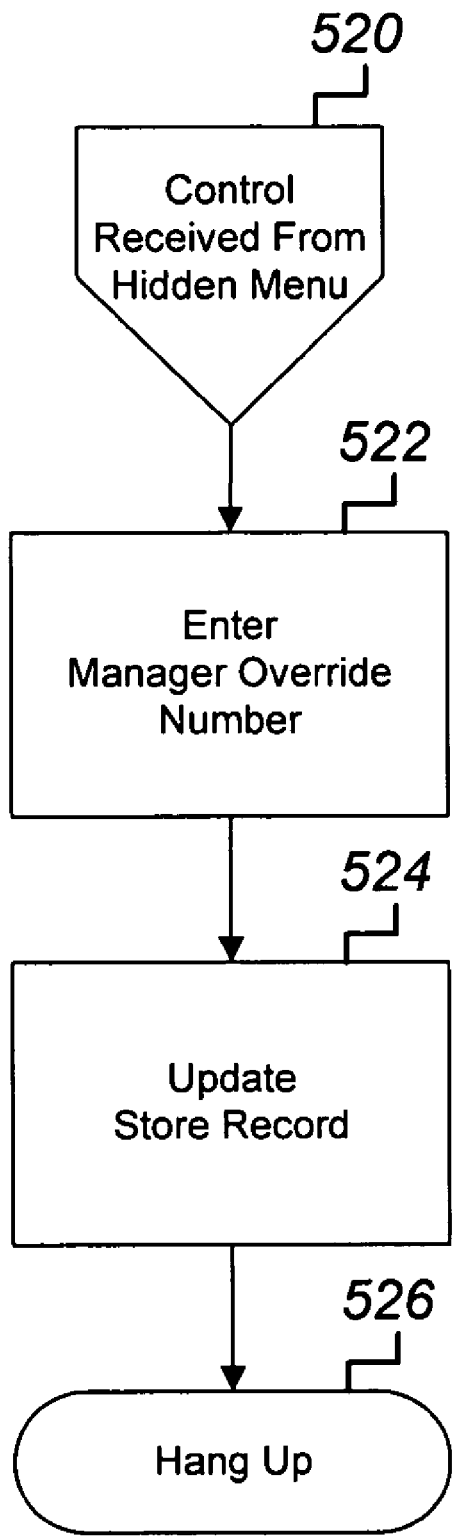
FIG. 20 is a schematic flow diagram of the change manager override process of the present invention.
Figure 21:
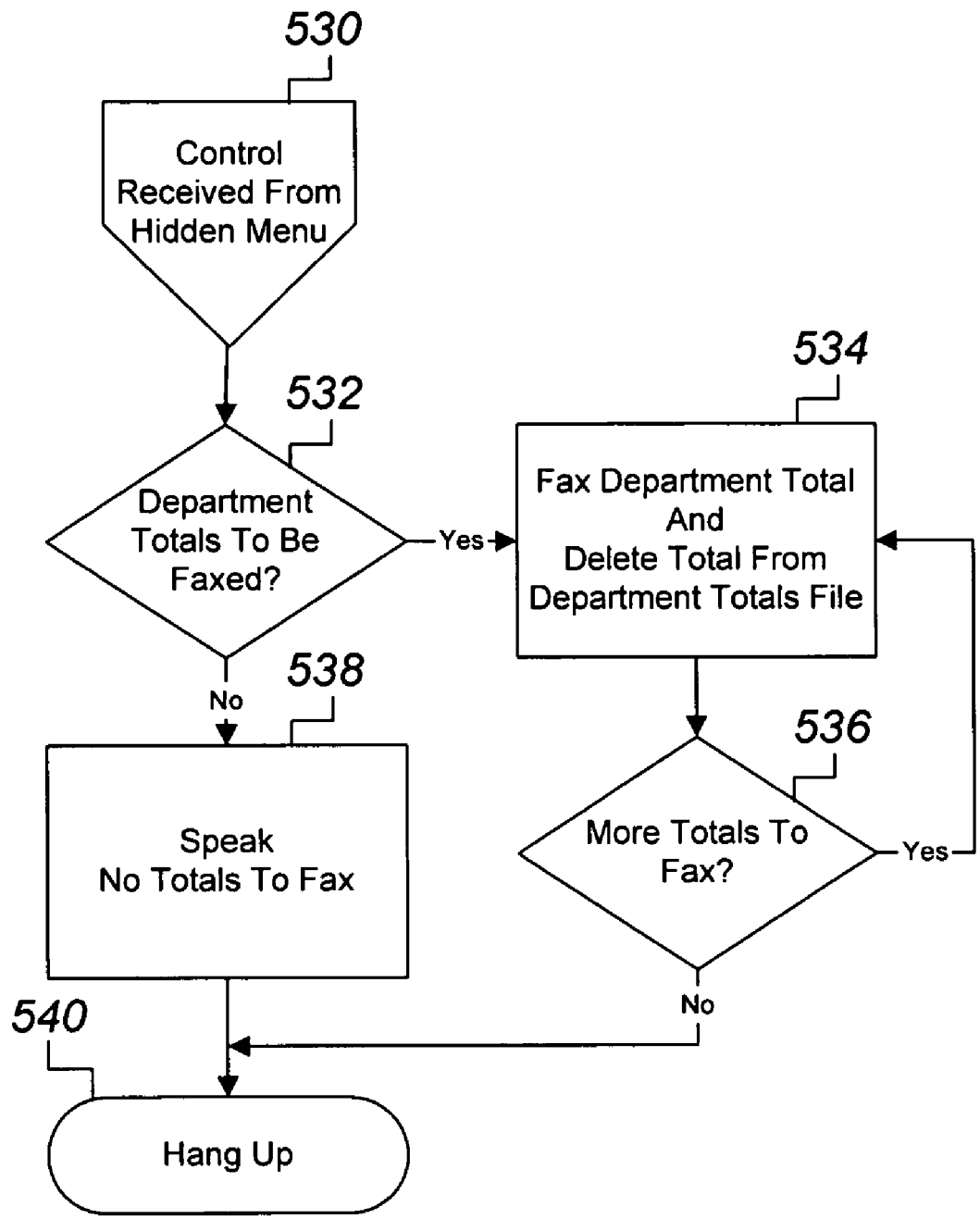
FIG. 21 is a schematic flow diagram of the fax department total process of the present invention.
Figure 22:
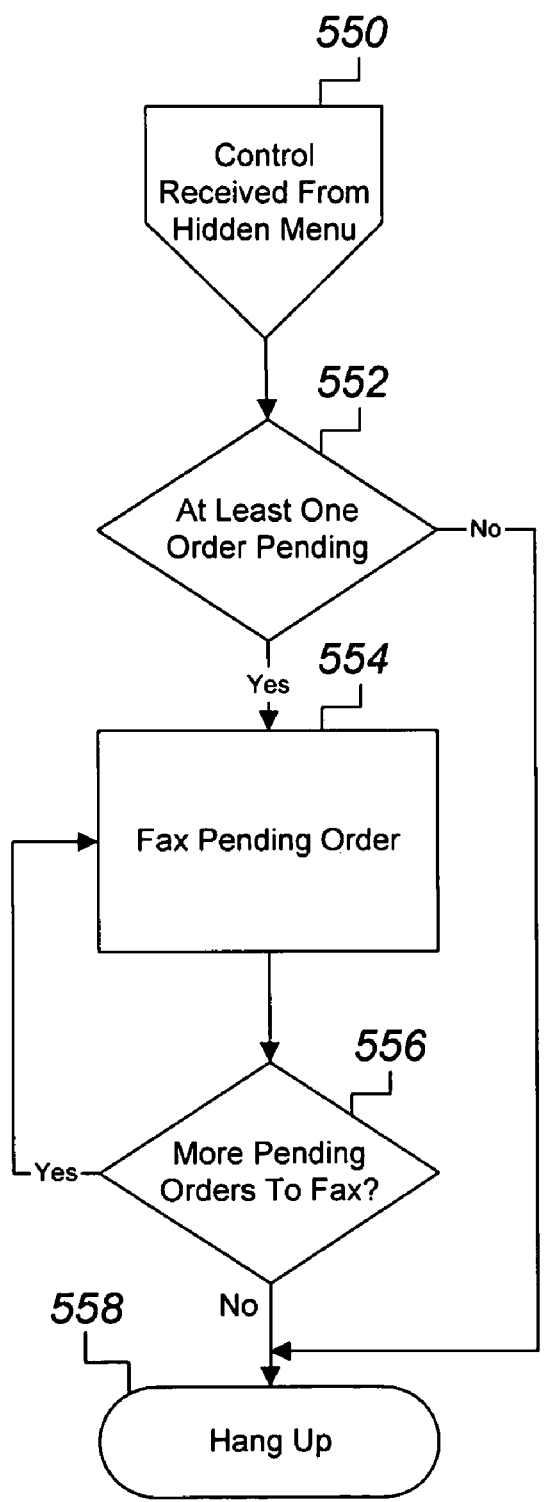
FIG. 22 is a schematic flow diagram of the fax pending orders report process of the present invention.
Figure 23:
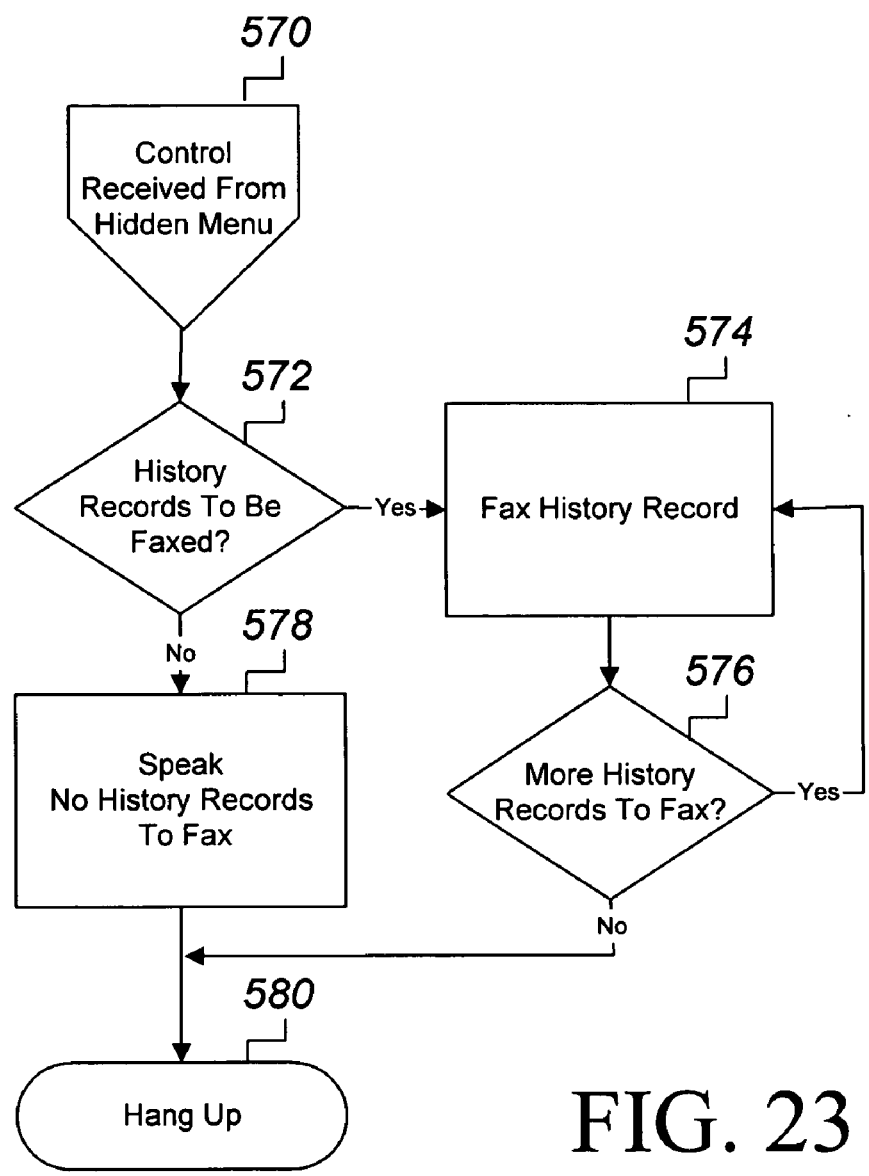
FIG. 23 is a schematic flow diagram of the fax history report process of the present invention.
Figure 24:
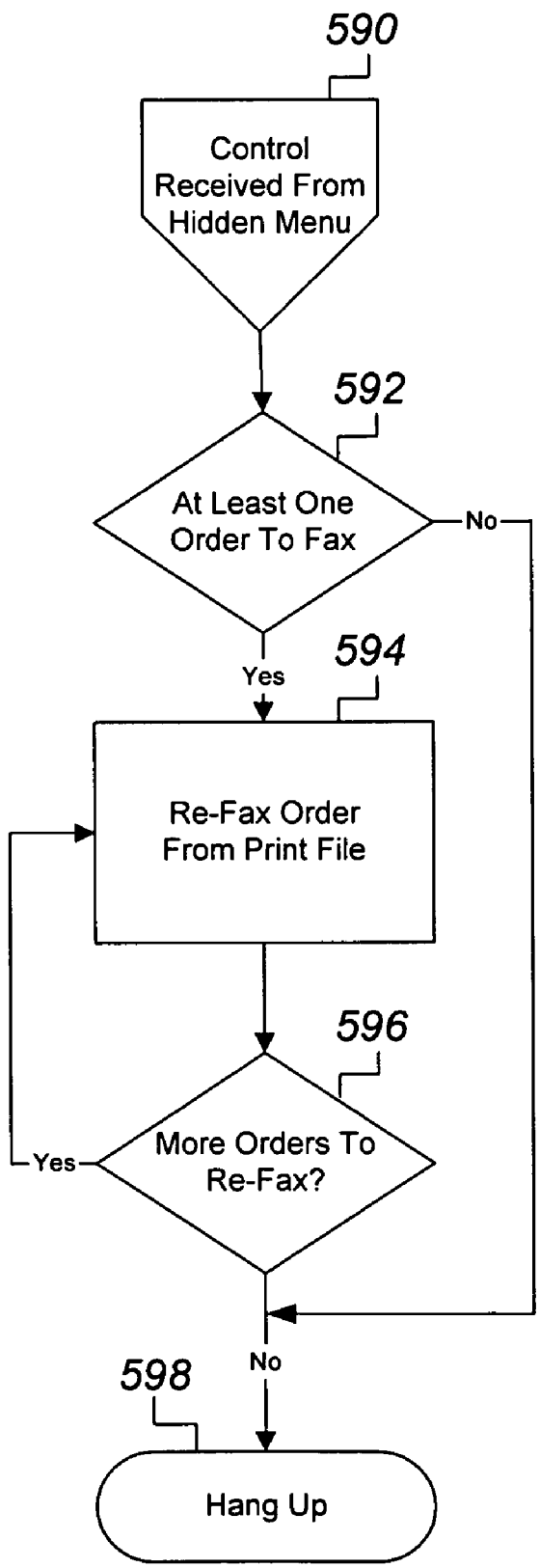
FIG. 24 is a schematic flow diagram of the process for refaxing orders of the present invention.
Figure 25:
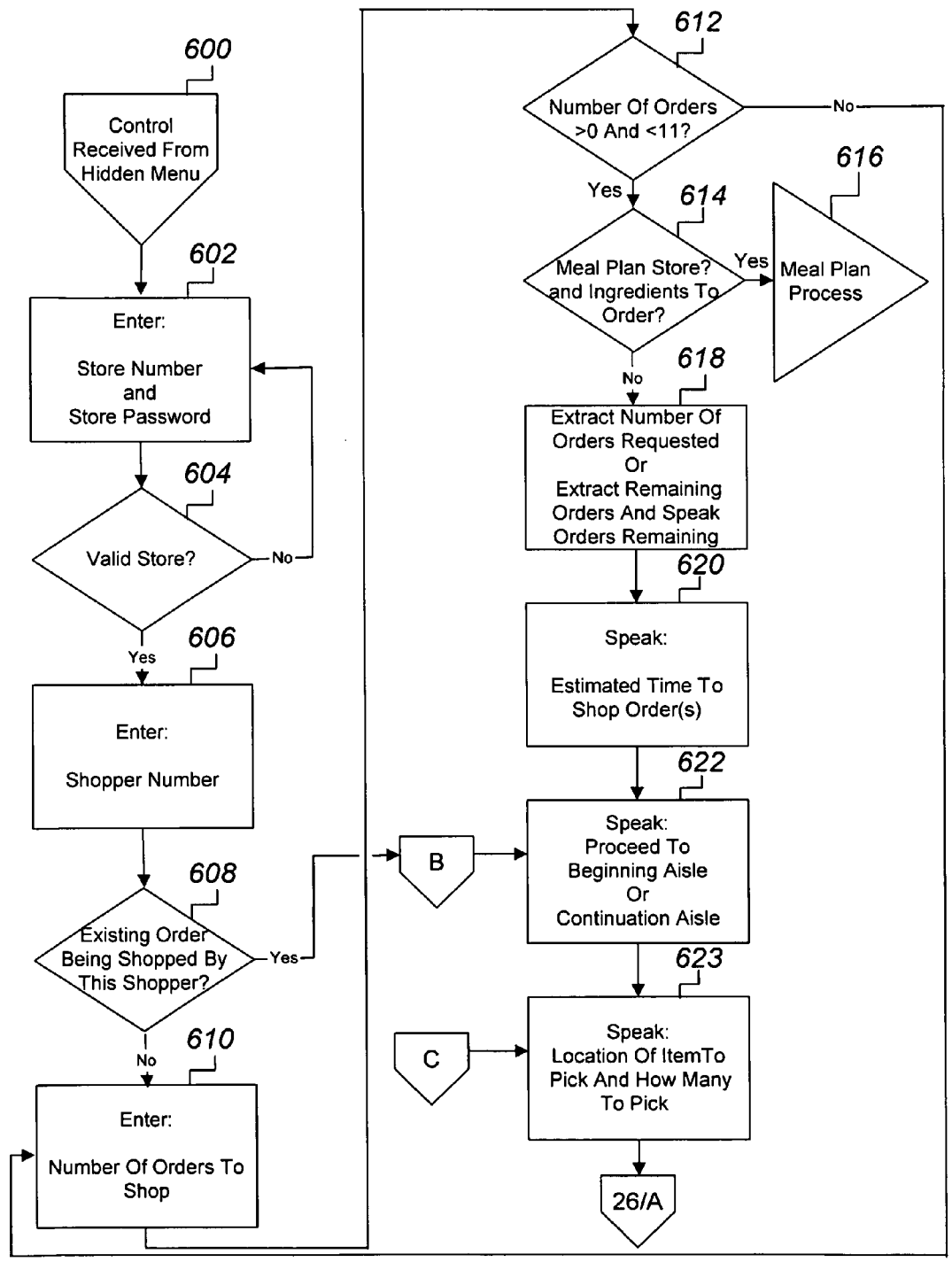
FIG. 25 is a schematic flow diagram of the order fulfillment process of the present invention.
Figure 26:
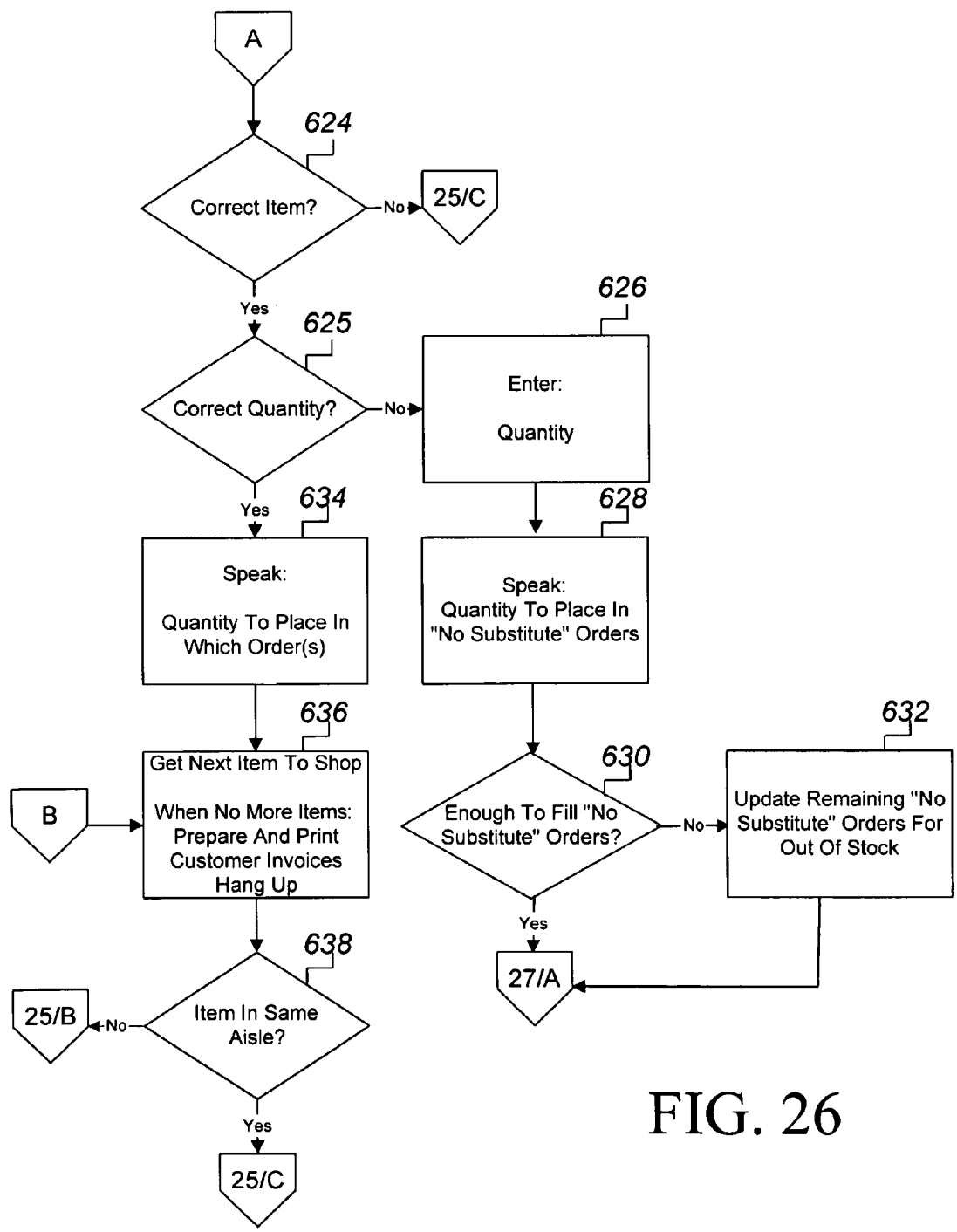
FIG. 26 is a schematic flow diagram of the order fulfillment process of the present invention.
Figure 27:
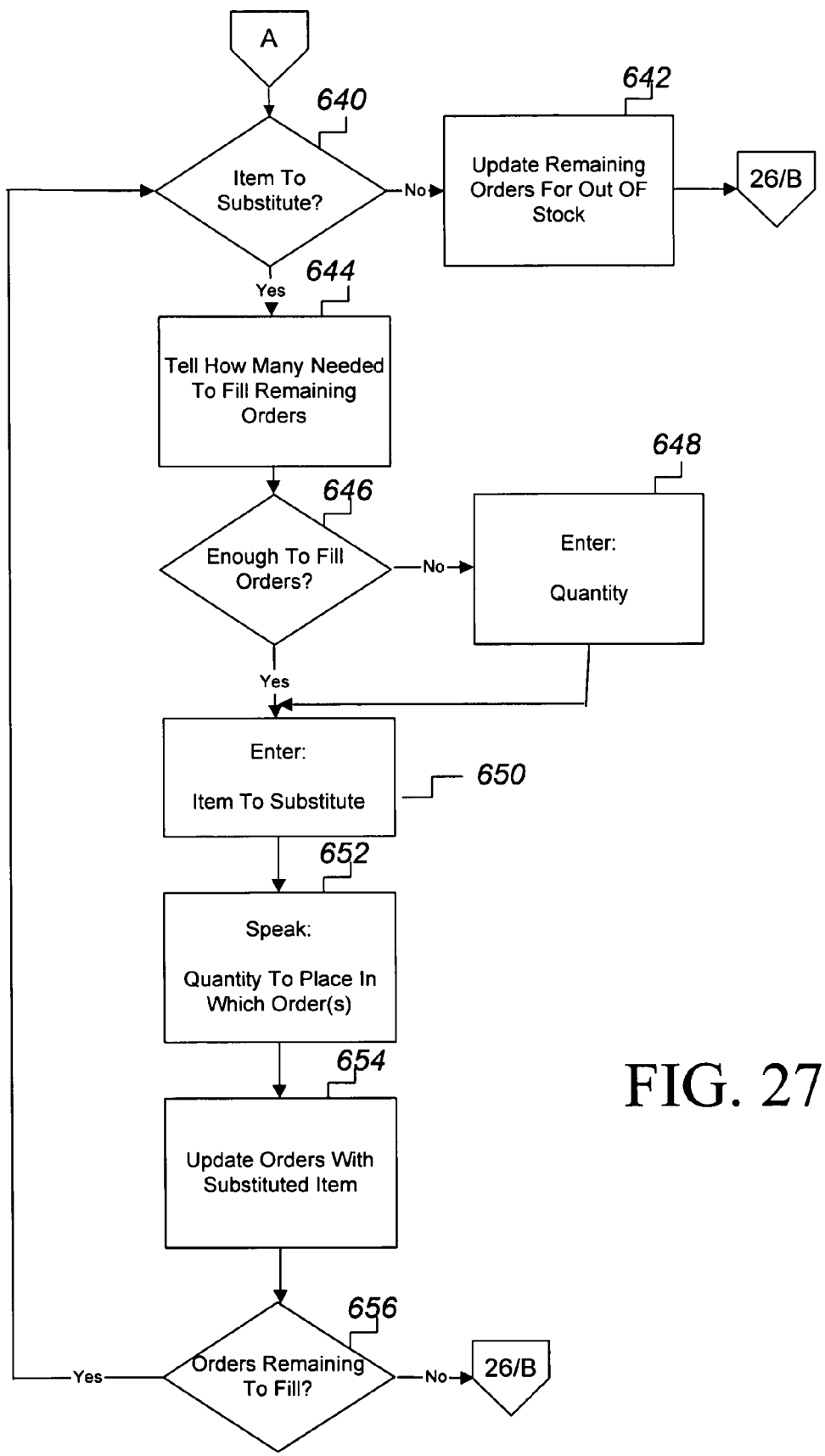
FIG. 27 is a schematic flow diagram of the order fulfillment process of the present invention.
Figure 28:
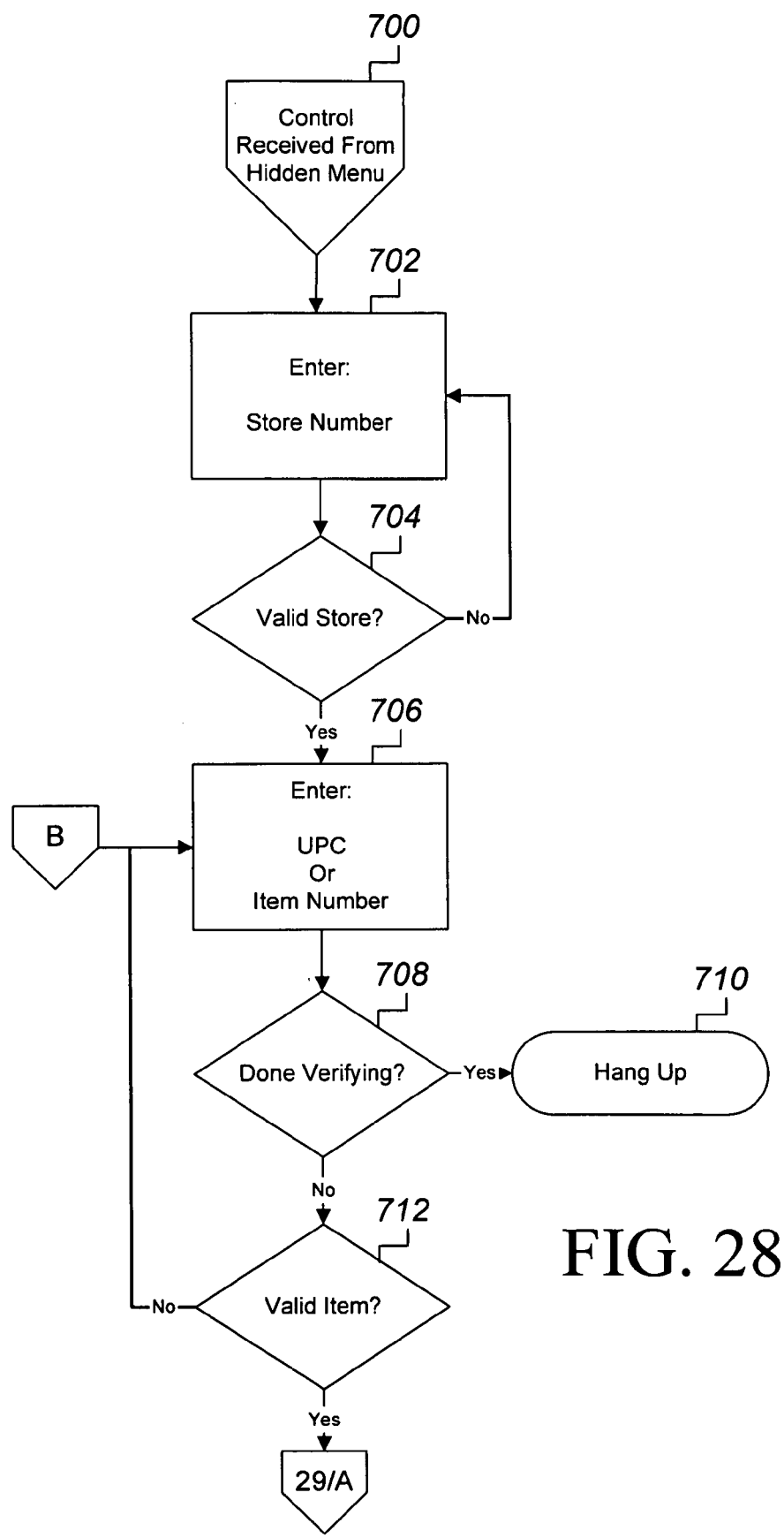
FIG. 28 is a schematic flow diagram of the price verify process of the present invention.
Figure 29:
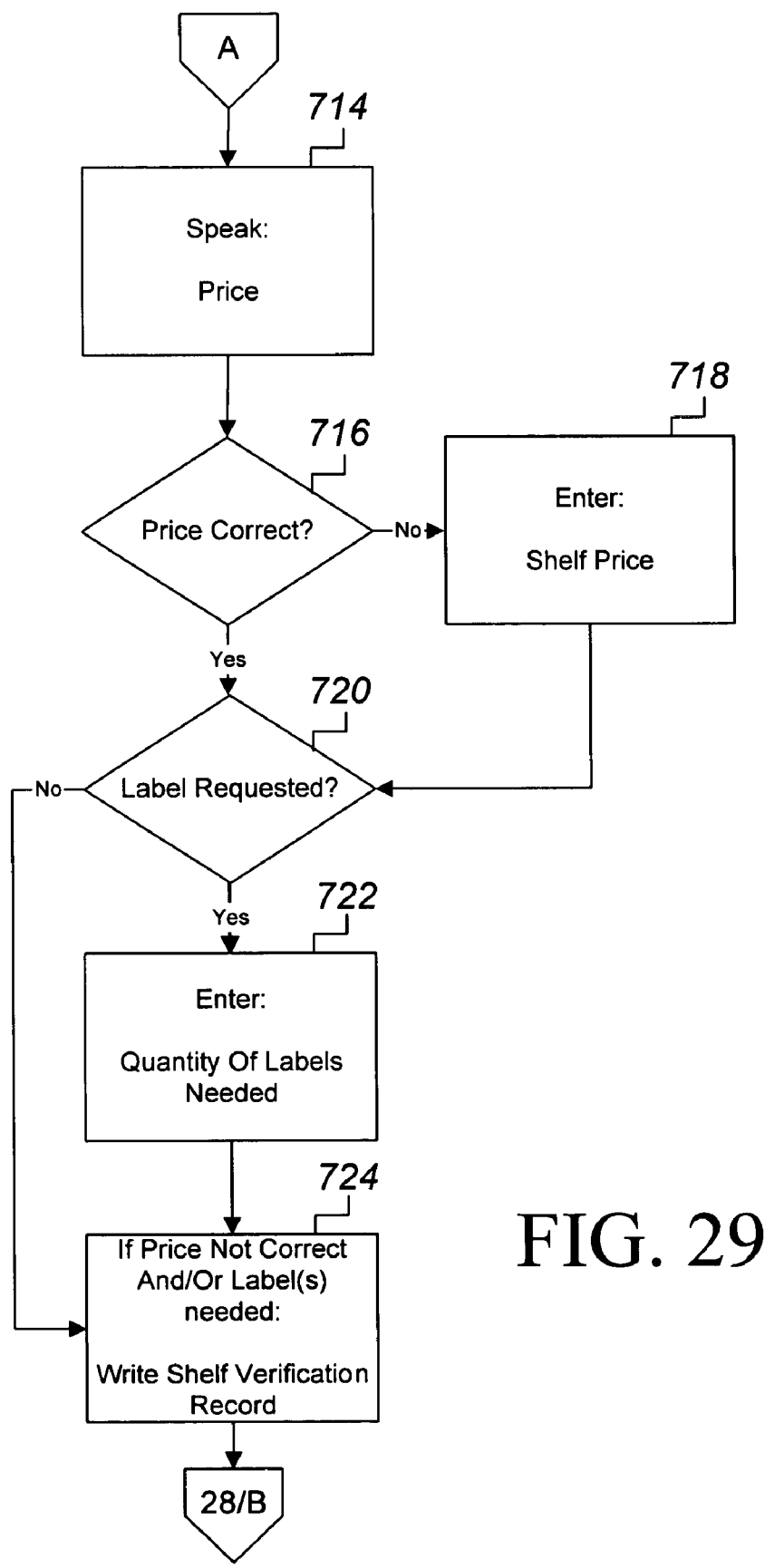
FIG. 29 is a schematic flow diagram of the price verify process of the present invention.
Figure 30:
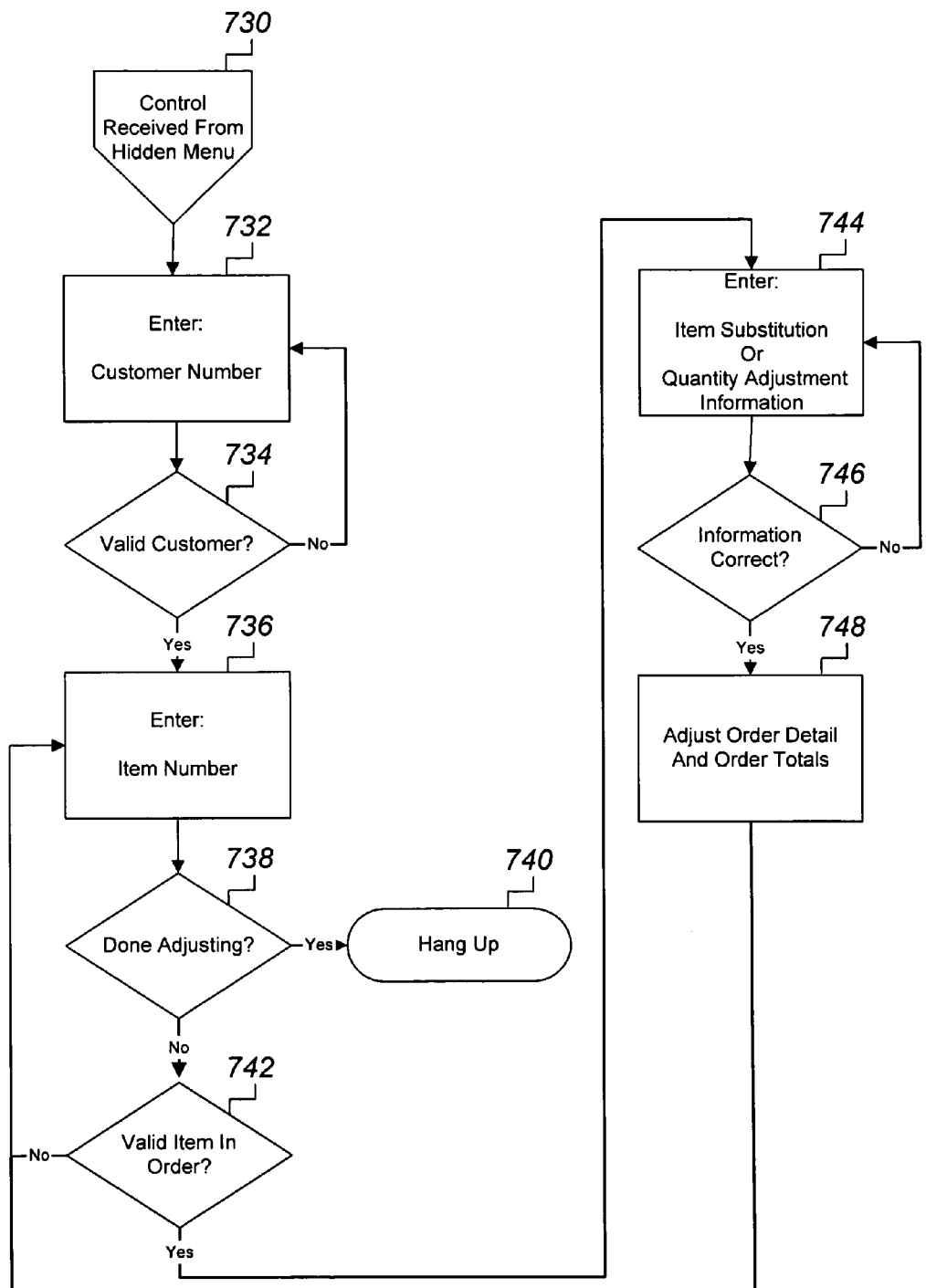
FIG. 30 is a schematic flow diagram of the net invoice process of the present invention.
Figure 31:
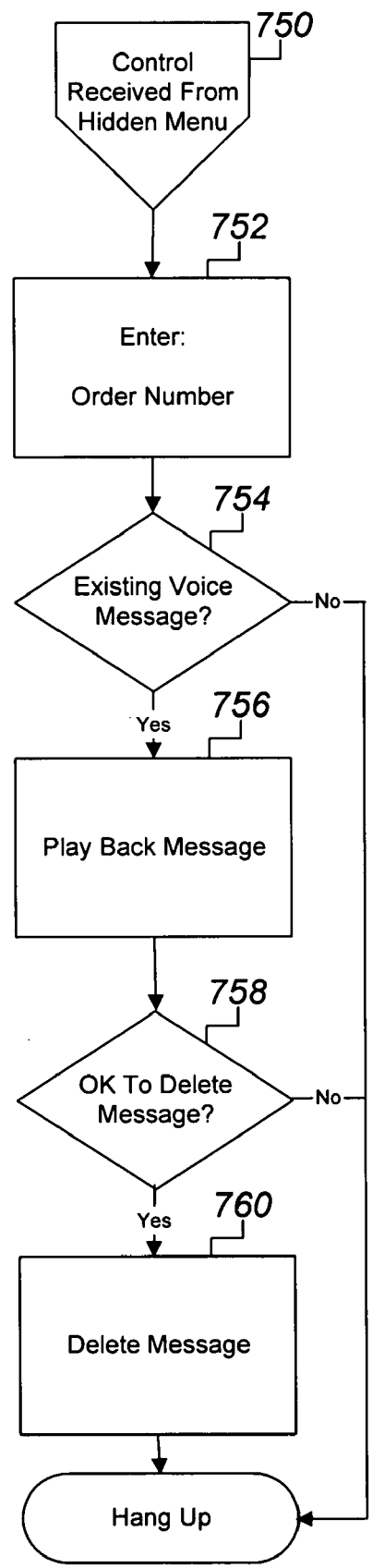
FIG. 31 is a schematic flow diagram of the order voice message process of the present invention.
Figure 32:
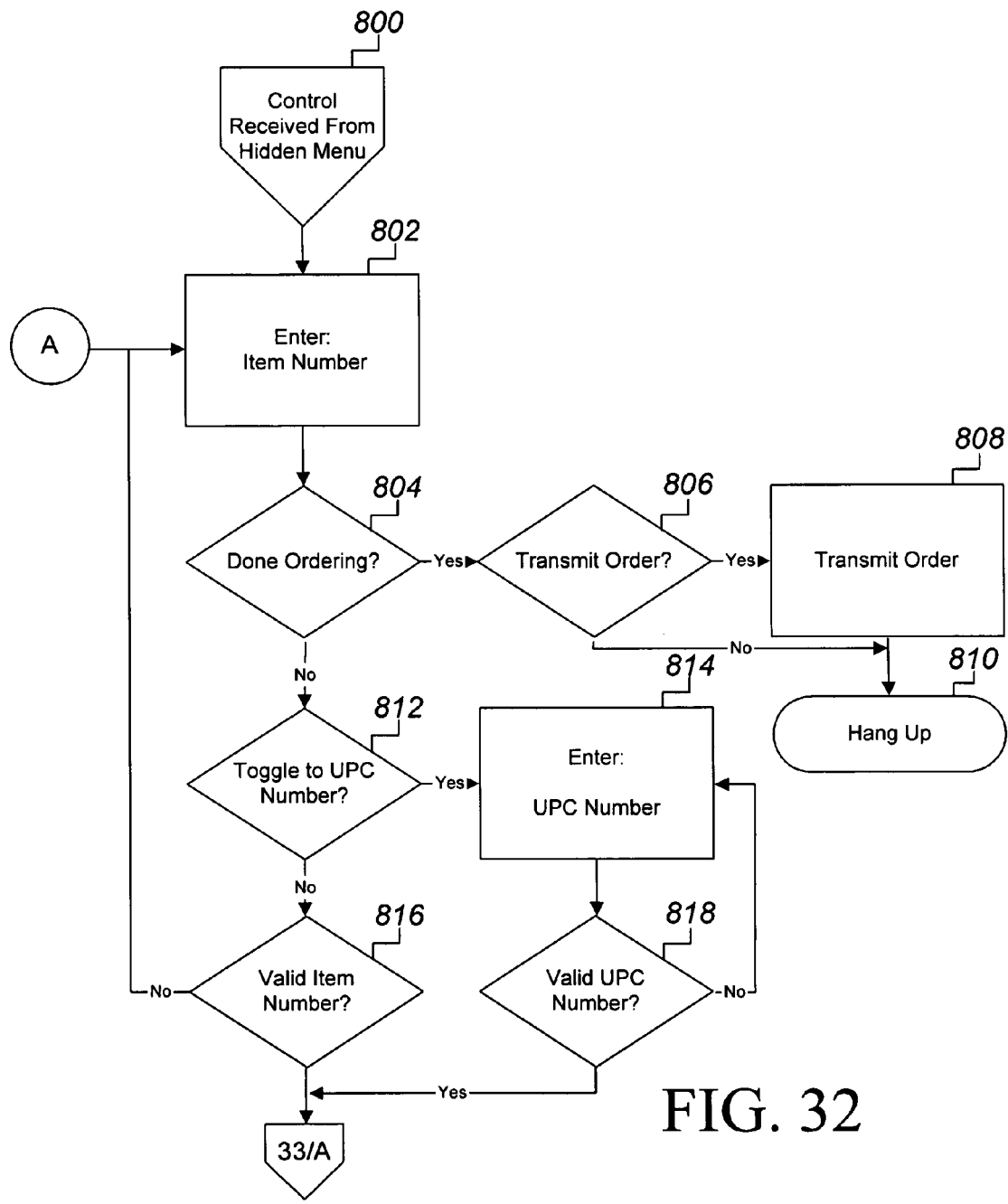
FIGS. 32 and 33 are schematic flow diagrams of the inventory ordering process of the present invention.

Preferably, before the payment option selection process is begun, the customer is able to enter the value of any coupons to be applied to the order cost (FIG. 9). The central station determines (test 236) if the option to offer the customer a coupon entry process has been selected in the store setup program. If the coupon entry option is not to be offered to the customer, the process proceeds to action 244. If the coupon entry option is to be offered, the customer is queried whether there are coupons to be applied to the order (test 238). If so, the customer is prompted to enter the coupon total (action 240). The coupon total is spoken and the customer is requested to confirm that the spoken coupon total is correct (test 242). If not, the customer is reprompted to enter the coupon total (action 240).

If the spoken coupon total is confirmed as correct by the customer, (or when the customer has not entered any coupons), the system announces (action 244) the characteristics of the order (such as whether delivery or pickup has been selected, the time and date of the transfer, and the order totals).

Payment Option Selection Process

After the order item entry process has ended, the payment option selection process is initiated to permit the customer to select the desired method of payment for the order. The central station checks the store account profile record to determine (test 246) if the particular store requires that all customer orders for that store account are to be (automatically) charged to a charge account, such as, for example, the customer's store account or a bank credit card account. If yes, the process proceeds to action 250.

If all orders are not to be automatically charged, the customer is queried whether the cost of the order is to be charged (test 248). If no, the process proceeds to action 256. If so, and in the case that there is an automatic charge instruction for the account, the central station checks (action 250) whether the customer is eligible to charge the order amount to the customer's charge account. If the charge is not validated (test 252), the customer is informed that the order cost will have to be paid by cash or check (action 254).

A trailer record is then written (see FIG. 10) into the order record in the database (action 256).

Special Order Instructions Process

Optionally, the central station inquires (test 257) if the customer has any special instructions (see FIG. 10) for the order. If yes, the customer is prompted to speak the special instructions (action 258) and the spoken instructions of the customer are recorded in a voice mail "box" attached to the order for reference by the store personnel handling the order fulfillment. If no special instructions are indicated by the customer (test 257), the central station determines if there are any special department products in the order (test 260). If yes, the customer's call is transferred (transfer 262) to the personnel of the department for further inquiry regarding the special department products, if any is required. If no, the customer is then thanked for the order (action 266), and a hang up of the telephone line is performed (termination 268). The order record creation process is thus ended.

Order Transmission Procedure

Upon completion of the order record creation process by the customer, the central station preferably initiates an order confirmation transmission procedure (see FIG. 11) in which the contents of the order record is delivered to the store to be, for example, printed in hardcopy form (e.g., for fulfilling the order or billing the order, etc.). If the particular store employs the interactive order fulfillment process of the invention, the order may be saved until the order has been fulfilled. Preferably, one or more orders records are transferred to the store station for the order fulfillment process (see below) and invoice production. Optionally, the order transmission procedure is performed through a facsimile transmission (also known as a "fax transmission") of the order to the store, although other methods of order transmission may optionally be employed.

After a predetermined period passes after the order record creation process has been completed (action 300), the central station determines if the particular store offers the meal plan process option of the invention (test 302). If so, control is passed (transfer 304) to the meal plan process (action 1000 in FIG. 36) for execution of the meal plan process.

If not, the central station reads the order record from the database (action 306). The central station determines (test 308) if the customer has a prior print order in the print file, and if so, the prior print order is deleted from the print file (action 310). If not, the central station extracts the order from the order record files, and formats the record for writing as a print file (action 312). The order is then transmitted to the customer's store (action 314) for processing, and the order record is then deleted from the order files in the database. The central station determines (test 316) whether the customer's store uses a delivery service, and if so, the notice of the order to be delivered is also faxed to the delivery service (action 318). If not, the central station determines (test 320) whether there are more customer orders to be faxed to the store locations. If so, the next order to be faxed is retrieved from the database (action 306). If not, the central station waits (action 300) for the creation of the next order requiring transmission.

Hidden Menu Procedure

If, during the initial portion of the order entry procedure (FIG. 4), a predetermined authorized access code or password was entered (test 108), a hidden menu transfer routine (FIG. 12) is initiated (transfer 110), and control is transferred from the order entry procedure (transfer 330). The remote station is presented with a menu of processes from which to select, and the remote station is prompted to enter a menu option (action 332). The menu option selected by the remote station is checked (test 334) for validity against the available options. The hidden menu preferably offers access to several sub-procedures or processes. Processes that are preferably accessible through the hidden menu include a process for printing order records (transfer 336), a process for reprinting order records (transfer 338), a process for printing out department totals (transfer 340), an process for entering coupon or credit amounts (transfer 342), a process for recording product descriptions and customer names (transfer 344), a process for printing pending orders (transfer 346), a process for printing a history report (transfer 348), a process for changing the manager override (transfer 350), a process for faxing department totals (transfer 352), a process for faxing a pending orders report (transfer 354), a process for faxing a history report (transfer 356), a process for refaxing orders (transfer 358), a process for creating an order assembly procedure (transfer 360), a process for verifying prices (transfer 362), a process for generating a net invoice (transfer 364), a process for hearing an order voice message (transfer 366), a process for ordering inventory (transfer 368), and a process for taking inventory (transfer 370).

Print Orders Process

In the print orders process (FIG. 13), control is received from the hidden menu (transfer 380). The central station determines if the particular store offers the meal plan process option of the invention (test 382). If so, control is passed (transfer 384) to the meal plan process (action 1000 in FIG. 36) for execution of the meal plan process.

If the no meal plan process is offered, prior orders are deleted from the print file (action 386) and orders to be printed from the order files are extracted from the database and are reformatted and written to the print file (action 388). If there are no orders in the print file to print (test 390), a message is transmitted to the remote station indicating that there are no orders to print (action 396), and a hang-up is initiated (termination 398). If there is at least one order in the print file to print (test 390), the order is printed (action 392) and the order is deleted from the order files in the database. The central station determines (test 394) if there are more orders to print, and if so, continues to print the orders (action 392) until all orders have been printed. Once there are no more orders to print, a hang-up is initiated (termination 398).

Reprint Order Process

The process for reprinting orders is utilized where there has been some error or interruption of an earlier attempt to print orders, such as, for example, a paper jam in the store printer. In the process for reprinting an order (FIG. 14), control is received from the hidden menu (transfer 400). The database is tested to determine if there is at least one order to reprint (test 402). If there is not at least one order to reprint, a hang-up is initiated (termination 408). If there is at least one order to print (test 402), the order is reprinted from the print file (action 404). The database is tested to determine if there are more orders to reprint (test 406), and as long as there are orders remaining to reprint, the orders are reprinted (action 404) until no orders remain to be reprinted, and a hang-up is initiated (termination 408).

Print Department Totals Process

In the process for printing department totals (FIG. 15), control is received from the hidden menu (transfer 420). The central station determines whether there are department totals to be printed (test 422). If there are no department totals to be printed (test 422), the central station announces that there are no totals to be printed (action 428), and a hang-up is initiated (termination 430). If there are department totals to be printed, the central station (action 424) prints the department total and deletes the department total from the department totals file. After the department total has been printed, the central station determines whether there are more department totals to be printed (test 426). If so, the next department total is printed (action 424). When there are no further department totals to be printed (test 426), a hang-up is initiated (termination 430).

Enter Coupon or Credit Amount Process

In the process for entering coupon or credit amounts (FIG. 16), control is transferred from the hidden menu (transfer 440). The central station prompts the remote station to enter the coupon or credit amount (action 442). The central station transmits the understood amount (e.g., by voice), and inquires if the understood amount is correct (test 444). If not, the remote station is reprompted to reenter the coupon or credit amount (action 442). If the amount entered is determined to be correct, the amount in the master file in the database is updated, and a voice speaks the total credit or coupon amount (action 446). A hang-up is initiated (termination 448).

Record Product Descriptions or Customer Names Process

In the process for recording product descriptions or customer names (FIG. 17), control is transferred from the hidden menu (transfer 450). The remote station is presented (e.g., by voice) with a menu that the prompts the remote station to choose between menu choices. Preferably, the choices include: whether product descriptions are desired to be recorded (test 452), if customer names are to be recorded (test 454), or if the remote station is finished with recording (test 456).

If the remote station indicates that product descriptions are to be recorded (test 452), the remote station is prompted to enter the product identification for which the description is to be recorded (action 458). The central station determines whether the product identification entered is valid (test 464). If not, the remote station is reprompted to enter the product identification (action 458). If a valid product identification is given, the remote station is prompted to record a product description (action 468). After the product description has been recorded, the remote station is again presented with the menu of recording options (e.g., tests 452, 454, and 456).

If the remote station indicates that customer names are to be recorded (test 454), the remote station is prompted to enter a customer number (action 460). The central station determines whether a valid customer number was entered by the remote station (test 466). If not, the customer is reprompted to reenter a customer number (action 460). If a valid customer number was entered (test 466), the central station records the customer's name (action 470) and the remote station is queried as to if there are further product descriptions to be recorded (test 452). After the customer name has been recorded, the remote station is again presented with the menu of recording options (e.g., tests 452, 454, and 456).

If the remote station indicates that no further recording is required, a hang-up is initiated (termination 462).

Print Pending Orders Report Process

In the process for printing a pending orders report (FIG. 18), control is transferred from the hidden menu (transfer 480). The central station determines whether at least one order is pending (test 482). If at least one order is not pending, a hang-up is initiated (termination 488). If at least one order is pending, the pending order is printed (action 484). The central station determines whether there are further pending orders to print (test 486). If yes, the succeeding pending orders are printed (action 484). If there are no further pending orders to print (test 486), a hang-up is initiated (termination 488).

Print History Report Process

In the process for printing a history report (FIG. 19), control is transferred from the hidden menu (transfer 500). The central station determines whether there are history records to be printed (test 502). If there are none, a prerecorded voice informs the remote station that there are no history records to print (action 506), and a hang-up is initiated (termination 510). If there are history records to be printed (test 502), a history record is printed (action 504). The central station determines whether there are further history records to print (test 508). If there are none, a hang-up is initiated (termination 510). If there are further history records to print (test 508), another history record is printed (action 504), a process which continues until all history records have been printed.

Change Manager Override Process

In the process for changing the manager override (FIG. 20), control is received from the hidden menu (transfer 520). The remote station is prompted to enter the manager override number (action 522). The store record is updated to reflect the manager override number (action 524). A hang-up is then initiated (termination 526).

Fax Department Total Process

In the process for faxing department totals (FIG. 21), control is received from the hidden menu (transfer 530). The central station determines whether there are department totals to be faxed (test 532). If there are no department totals to be faxed, a voice informs the remote station that there are no totals to fax (action 538), and a hang-up is initiated (termination 540). If there are department totals that may be faxed (test 532), the department total is faxed and the total is deleted from the department totals file (action 534). A determination is made whether there are more department totals to be faxed (test 536). If not, a hang-up is initiated (termination 540). If there are further department totals to fax, the next department total is faxed and then deleted from the department totals file (action 534) until all department totals have been transmitted.

Fax Pending Orders Report Process

In the process for faxing a pending orders report (FIG. 22), control is received from the hidden menu (transfer 550). The central station determines whether at least one order is pending (test 552). If not, a hang-up is initiated (termination 558). If there is at least one order pending, a pending order is faxed (action 554). The central station then determines (test 556) whether there are further pending orders to fax. If so, another pending order is faxed (action 554) until all pending orders have been transmitted. If not, a hang-up is initiated (termination 558).

Fax History Report Process

In the process for faxing a history report (FIG. 23), control is received from the hidden menu (transfer 570). The central station determines (test 572) whether there are history records to be faxed. If there are no history records to be faxed, a prerecorded message states that there are no history records to fax (action 578), and a hang-up is initiated (termination 580). If the central station determines that there are history records to be faxed (test 572), a history record is faxed (action 574). The central station then determines whether there are more history records available to fax (test 576). If so, another history record is faxed (action 574) until all history records have been transmitted. If there are no more history records to fax (test 576), a hang-up is initiated (termination 580).

Refaxing Orders Process

Optionally, a process for refaxing orders is available to the remote station so that interrupted or incomplete fax transmissions of orders may be refaxed to the remote station. The process for refaxing orders (FIG. 24), control is received from the hidden menu (transfer 590). The central station determines whether there is at least one order to fax (test 592). If not, a hang-up is initiated (termination 598). If there is at least one order to fax, the order is refaxed from the print file (action 594). The central station then determines (test 596) whether there are further orders to refax. If not, a hang-up is initiated (termination 598). If so, an order is refaxed from the print file (action 594), a routine which is repeated until all orders have been refaxed, and then a hang-up is initiated (termination 598).

Order Fulfillment Process

The order assembly or fulfillment process may be directed by the central station or by a local station at the order store, but is preferably directed by the station which maintains the database containing the data for the location of the products in the particular store (e.g., by aisle).

The directing station converts the listing of products in the record of the order or orders to be fulfilled into a sequence of instructions that will guide the movements of a person (or "shopper") assembling, or fulfilling, one or more orders. Typically, the shopper will be a store employee. The directing station is linked to the shopper by telephone line into the store, and the wireless directing apparatus is used by the shopper to interactively communicate with the directing station.

In the process for creating an order assembly procedure (FIG. 25), control is received from the hidden menu (transfer 600). The remote station (e.g., the shopper) is prompted to enter a store identification, e.g., an identifying number (action 602) for calling up the appropriate data base (e.g., product location and customer order) records for that particular store. The central station then determines whether the store number response of the remote station is a valid store number (test 604). If not, the remote station is reprompted to enter the store number (action 602). If so, the remote station is prompted to enter a shopper identification, e.g., number (action 606) to identify the particular shopper seeking orders for assembly. The central station determines whether an existing order is being shopped (e.g., currently being assembled in the store) for the shopper identification number entered by the remote station (test 608). If yes, the central station advances to the initial shopping instruction (action 622) of the process, e.g., the initial movement instruction of the order fulfillment path determined by the directing station. If not, the remote station is prompted to enter the number of orders to be shopped during the current order assembly session (action 610).

The directing (e.g., central) station then determines whether the number of orders entered is within a predetermined acceptable range of orders, such as, for example, greater than 0 orders and less than 11 orders. If not, the remote station is reprompted to enter the number of orders to shop (action 610). If the number of orders entered by the shopper is acceptable, the central station determines if the meal plan process option of the invention is available for the particular store (test 614) in which the shopper is located. If so, control is passed (transfer 616) to the meal plan process (action 1000 in FIG. 36) for execution of the meal plan process.

If the meal plan option is not available for the store, the directing station extracts from the database the number of orders requested or extracts the remaining orders from the database (if not enough orders remain in the database to fulfill the number of orders requested) and a voice generated by the directing station announces the number of orders remaining (action 618) for order assembly. The directing station announces (preferably by voice) the estimated time to assemble (or fulfill) the number of customer orders requested (action 620).

At the beginning of the order fulfillment, or "shopping", process, the directing station determines an order fulfillment path based upon the contents of the customer orders to be assembled and the individual product locations within the product storage space of the store in which the shopper is located. The order fulfillment path is preferably comprised of a series of person (or shopper) movement instructions optimized for minimizing the number of movements by the shopper without retracing portions of the path through the product storage space. The particular products of a number of customer orders are combined together and assembled simultaneously by the shopper. At the initiation of the order assembly process, the directing station transmits to the order fulfillment shopper (via the portable station of the store station) the location information of the first product to be picked for the order assembly. The product location information preferably comprises an aisle value or number (e.g., aisle 1, aisle 2, aisle 3, etc.), an aisle side value (e.g., indicating that the product is located on the left side or right side of the aisle as the shopper moves down the aisle in a predetermined direction), and a shelf value (e.g., shelf 1, shelf 2, shelf 3, etc.). The shopper is instructed to proceed to the aisle location where the first of the product items to be shopped are located (action 622). The directing station transmits the location of the first product item to be added to the order (e.g., the aisle side information and the shelf information), the description of the product, and the quantity of that product to pick up (action 623).

The shopper then transmits to the directing station the product code of the product picked, the product code preferably being a marketing code marked on the product, such as the "Universal Product Code", or optionally a store-determined inventory code marked on the shelf adjacent the product location. If there is an insufficient quantity available on the shelf to fill the orders being assembled, an "insufficient quantity" signal is transmitted (such as, for example, by pressing the "star" key of the telephone portable unit) by the shopper to the directing station. The directing station determines whether the correct product has been selected (test 624) by the shopper based upon the marketing code transmitted by the shopper. If the marketing code transmitted does not match the marketing code associated with the ordered product in the system database, the directing station repeats the product location information of the product item to be picked and the quantity of items to be picked (action 623), to permit the shopper to verify that the correct product item was picked or to pick the correct product item if an incorrect item was picked.

If the directing station determines that the correct product item was picked by the shopper, the directing station further determines whether the correct quantity has been picked by the shopper (test 625). If the correct quantity was not picked, the shopper is prompted to enter and transmit to the directing station the quantity of the product available on the shelf (action 626). The directing station then announces the quantity of the product for the shopper to place in 'no substitution' orders (action 628) for which the customer has indicated that other similar products may not be substituted. The directing station queries the shopper with the portable station whether there is a large enough quantity of product available on the store shelf to fill the 'no substitution' orders (test 630) being assembled by the shopper. If there is not a sufficient product quantity on the shelf to fill the no substitution orders, the directing station updates the order records (e.g., reducing the total cost) of the remaining 'no substitution' orders due to the out-of-stock condition for the product item (action 632). If the product quantity available on the shelf is insufficient to fill one or more customer orders which do permit substitution of similar products, the directing station advances to the substitution process (test 640).

If the directing station determines that the correct quantity of the product was picked to fulfill all orders being assembled (test 625), the directing station announces the quantity of product to place in each of the customer orders being filled (action 634). The directing station then gets the next product on the predetermined order fulfillment path from the database (action 636). The directing station determines whether the next product to be shopped is in the same aisle (test 638). If not, the directing station announces (e.g., by voice) the value or number of the next aisle of the product storage space for the shopper to proceed to (action 622). If so, the directing station determines (test 640) whether there is a product to substitute into one or more of the orders being shopped (see FIG. 27). If there is no product to substitute, the directing station updates the remaining customer orders with regard to the out-of-stock product (action 642), and the directing station gets the next product to shop from the order record file in the database (action 636).

If there is a product to substitute, the directing station informs the shopper of the quantity needed to fill the remaining orders being shopped (action 644), and queries the shopper whether enough of the substitute product items are available to fill the remaining orders to be shopped (test 646). If not, the shopper is prompted to enter the quantity of the substitute product that is available on the shelf (action 648). Then (and when enough substitute product items are available on the shelf), the directing station enters the product to substitute (action 650). A voice from the directing station announces the quantity of substitute product to place in each of the orders that are being assembled (action 652). The directing station then updates the order files with the substituted product (action 654). The directing station then gets the next product to shop to fulfill the order (action 636). This process continues until all products of the orders being assembled have been picked.

Price Verify Process

In the process for verifying prices (see FIG. 28), control is received from the hidden menu procedure (transfer 700). The remote station is prompted (action 702) to enter the store identification (e.g., store number). The central station determines whether the store number that has been entered is valid (test 704). If not, the remote station is reprompted to enter the store number (action 702). If so, the remote station is prompted to enter a product identification, such as a Universal Product Code ("UPC") number or a product number (action 706). The central station inquires whether the remote station has further product prices to verify (test 708). If no, a hang-up is initiated (termination 710). If yes, the central station determines whether the product identification entered is valid (test 712). If not, the remote station is reprompted (action 706) to enter a product identification (e.g., UPC or product number). If so, a voice announces (see FIG. 29) the price (action 714). The remote station is queried (test 716) whether the price announced is correct. If not, the remote station is prompted to enter the shelf price (action 718). If so, the central station inquires as to whether pricing labels are needed for the products (test 720). If labels are needed, the remote station is prompted to enter the quantity of labels needed (action 722). A shelf verification record is written on the database if the price is not correct and/or the quantity of labels are needed (action 724). The remote station is then prompted (action 706) to enter a product identification (see FIG. 28), and the process is repeated until all the desired price verifications have been performed.

Net Invoice Process

In the case where the invoice of the customer account has to be adjusted or otherwise changed due to, for example, an order item being out of stock, a process for (remotely) adjusting the customer account invoice is provided. In the process for producing a net invoice (FIG. 30), control is received from the hidden menu (transfer 730). The remote station is prompted to enter the customer number (action 732) of the account for which the invoice is to be produced. The central station then determines whether a valid customer number has been entered (test 734). If not, the remote station is reprompted to enter a customer number (action 732). If a valid customer number has been entered, the remote station is prompted to enter a product identification (action 736). The remote station is then queried whether any further adjustment to the invoice is desired (test 738). If yes, a hang-up is initiated (termination 740). If no, the central station determines whether the product identification that was entered is a valid product in the order record (test 742). If not, the remote station is reprompted to reenter a product identification (action 736). If so, the remote station is prompted (action 744) to enter the product substitution information or the quantity adjustment information for updating the order record in the database. The remote station is then queried as to if the entered information is correct (test 746). If not, the remote station is reprompted to enter the product substitution information quantity adjustment information (action 744). If so, the central station adjusts the order details and order totals in the order record in the database (action 748). The central station then prompts the remote station to enter a product identification (action 736). The process is repeated until the remote station indicates that no further adjusting is to be made (test 738).

Order Voice Message Process

In the order voice message process (FIG. 31), control is received from the hidden menu (transfer 750). The remote station is then prompted (action 752) to enter the order identification (e.g., number). The central station then determines whether there is an existing voice message for the order (test 754). If not, a hang-up is initiated (termination 762). If so, the central station plays back the voice message (action 756). The central station then inquires whether it is desired to delete the message (test 758). If not, a hang-up is initiated (termination 762). If so, the voice message is deleted (action 760), and a hang-up is then initiated (termination 762).

Inventory Ordering Process

In the inventory ordering process (FIG. 32), control is received from the hidden menu (transfer 800). The remote station is prompted to enter the product number of the product to be ordered (action 802). If the remote station indicates that inventory ordering is complete (e.g., by the entry of a special interrupt code) at test 804, the remote station is queried whether the order should be transmitted. If no, a hang up is initiated (termination 810). If yes, the order is transmitted (action 808) and a hang up is initiated (at termination 810).

If ordering is to continue (test 804), the remote station is given the option (test 812) to use UPC numbers (as opposed to, for example, individual store product numbers). If the UPC ordering option is selected, the remote station is prompted to enter the UPC number of a product to be ordered for inventory (action 814), and the response is checked for validity (test 818). If the response is determined not to be valid, the remote station is reprompted to enter the UPC number of the desired number (action 814). If the entry is valid, the process proceeds to action 820.

Similarly, if the UPC number option is not selected, the directing station determines if the product number entered by the remote station is valid (test 816). If the product number is not valid, the remote station is reprompted to enter the product number of the product (action 802).

Figure 33:
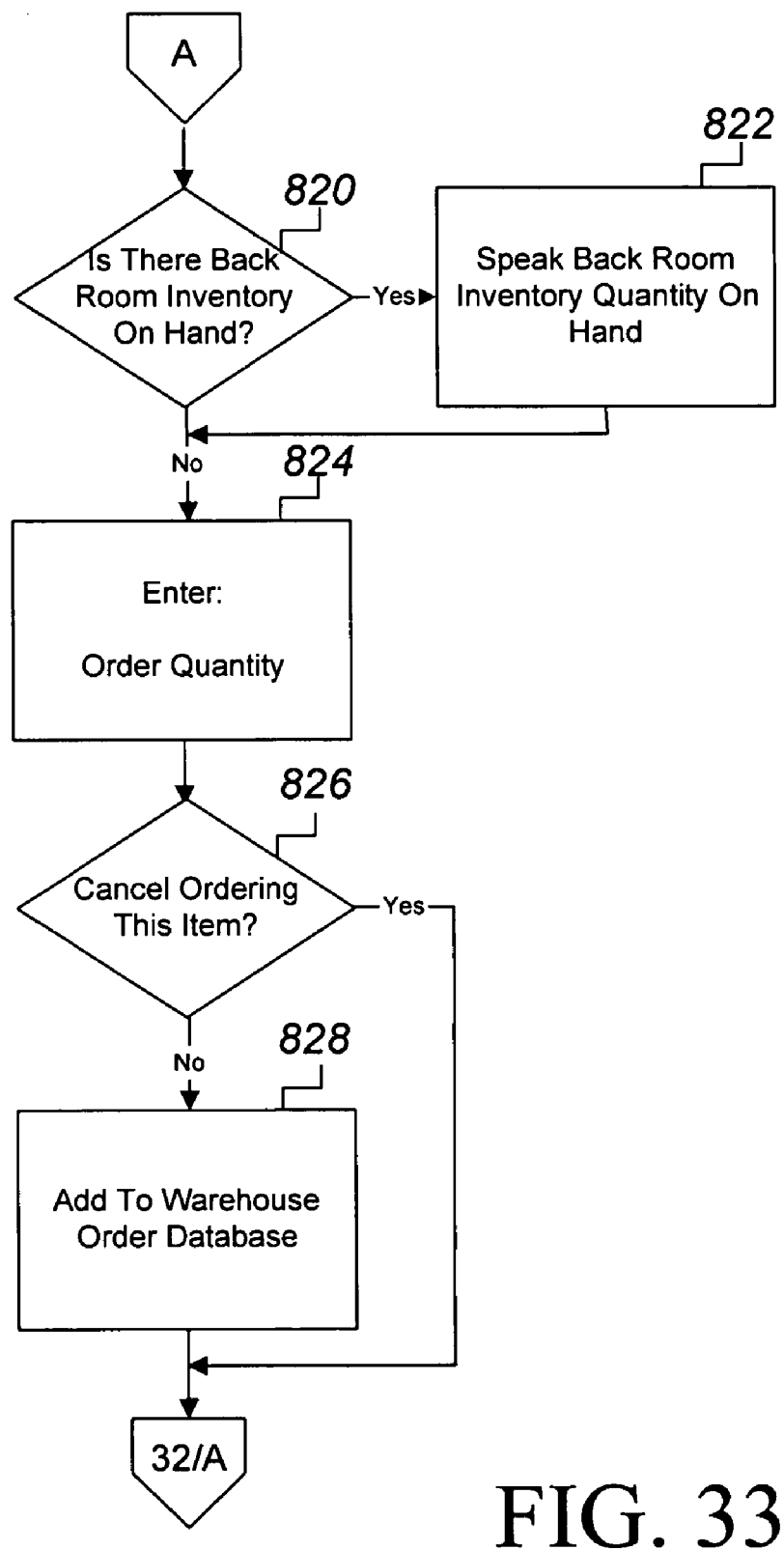
Figure 34:
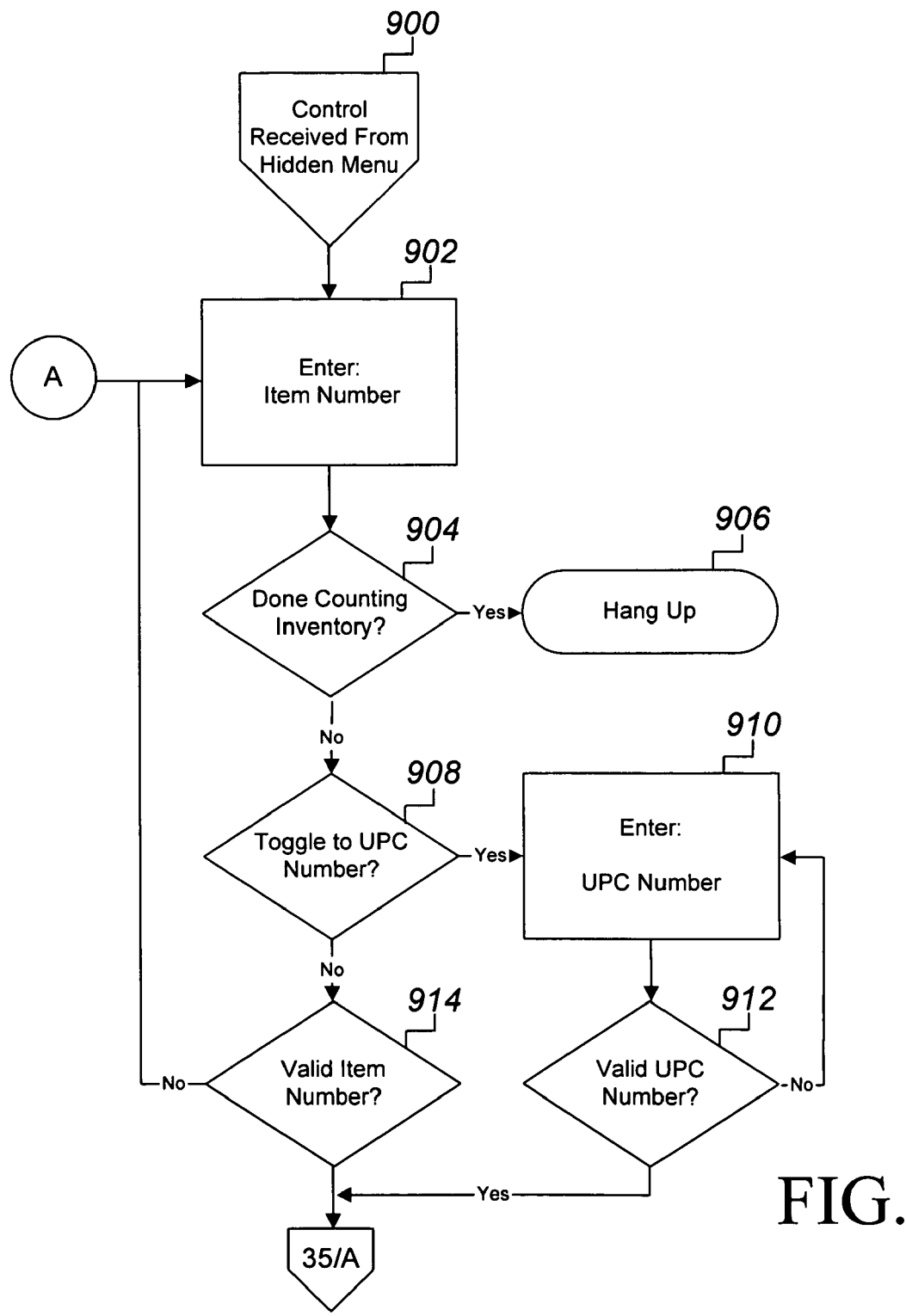
FIGS. 34 and 35 are schematic flow diagrams of the physical inventory counting process of the present invention.

When the product number of a product is determined to be valid, the central station determines if the product is available in another product storage space (e.g., storage in the back of the store) of the store (test 820 in FIG. 33). If so, the central station transmits the quantity available in the other product storage space (action 822).

The central station prompts the remote station to enter the desired order quantity (action 824), and inquires whether the order of the product is to be cancelled (test 826). If so, the process returns to action 802 and the remote station is prompted to enter another product number. If the product is to be ordered, the central station adds the product number and quantity to a warehouse order database for ordering. The central station then prompts the remote station to enter the product number of another product to be ordered (action 802).

Physical Inventory Counting Process

In the physical inventory counting process (FIG. 34), control is received from the hidden menu (transfer 900). The remote station is prompted to enter the product number of the product to be inventoried (action 902). The remote station is queried as to whether the inventory counting process is finished (test 904). If so, a hang up is initiated (termination 906). If the remote station indicates that the inventory counting process is not complete, the remote station is given the option (test 908) to use UPC numbers (as opposed to, for example, individual store product numbers). If the UPC inventorying option is selected, the remote station is prompted to enter the UPC number of a product to be counted for inventory (action 910), and the response is checked for validity (test 912). If the response is determined not to be valid, the remote station is reprompted to enter the UPC number of the desired product (action 910). If the entry is valid, the process proceeds to action 916.

Similarly, if the UPC number option is not selected, the directing station determines if the product number entered by the remote station is valid (test 914). If the product number is not valid, the remote station is reprompted to enter the product number of the product (action 902).

Figure 35:
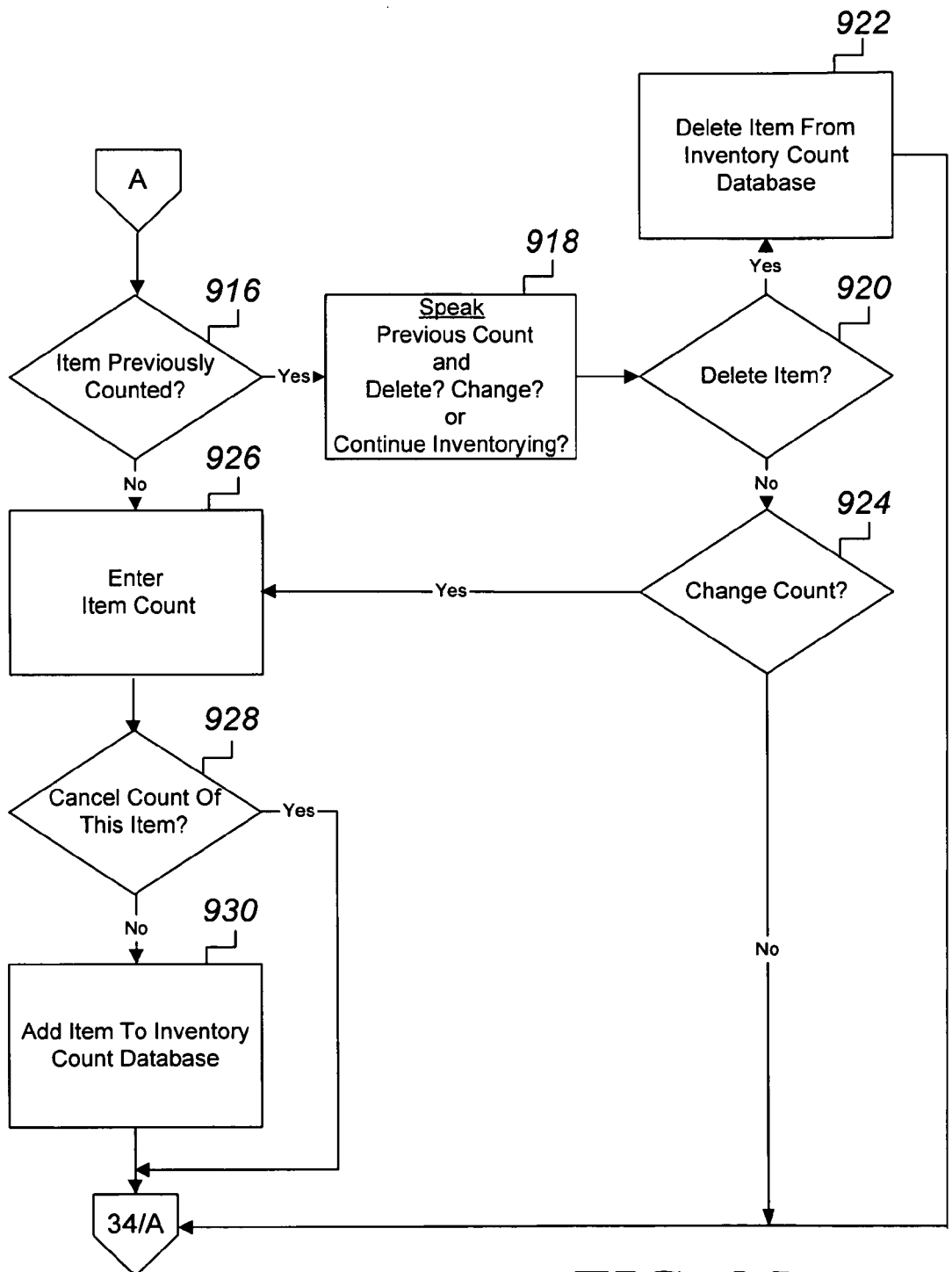
Figure 36:
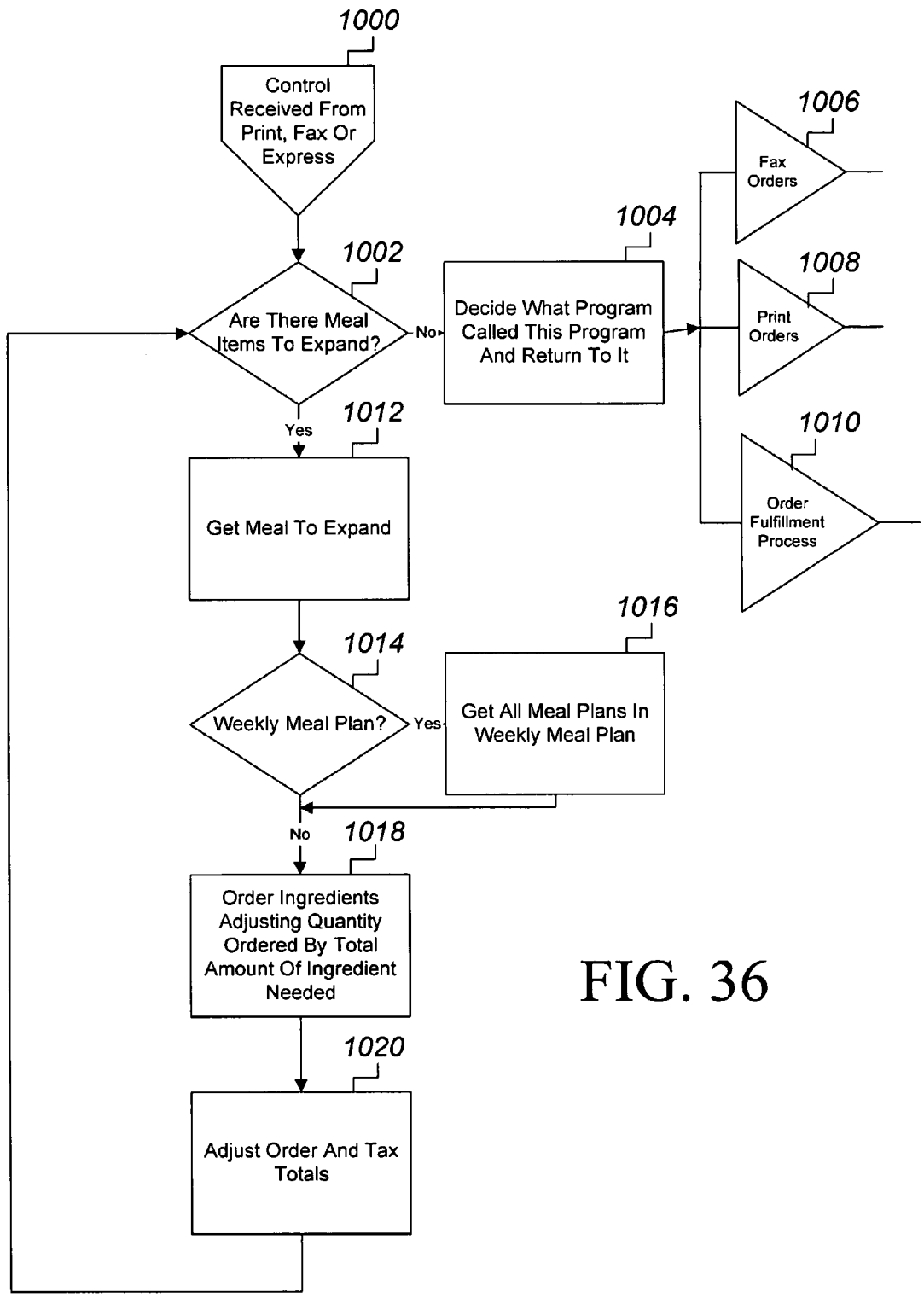
FIG. 36 is a schematic flow diagram of the meal plan ordering process of the present invention.

When the product number of a product is determined to be valid, the central station determines if the quantity of the product has been previously counted (test 916 in FIG. 35). If so, the central station transmits (such as by generated speech) the previous inventory count value and the remote station is presented with the options of deleting the previous count or changing the previous count (action 918). If the remote station selects the deletion option (test 920), the central station deletes the product from the inventory count database (action 922). If the remote station has indicated the desire to change the inventory count (test 924), the remote station is prompted to enter the product count (action 926) for the previously identified product.

After the product count has been entered (action 926), the remote station is permitted to cancel the entered inventory count of the product (test 928). If cancellation is desired, the process returns to action 902 and the remote station is prompted to enter another product number. If the count of the product is to be retained, the central station adds the product number and quantity to the inventory count database. The central station then prompts the remote station to enter the product number of another product to be counted for inventory (action 902).

Meal Plan Ordering Process

In the meal plan ordering process (FIG. 36), control is received from any of the various processes employing the meal plan process (transfer 1000). The central station determines if the order contains meal plan items to be expanded into the individual constituent products making up one or more meals of the particular meal plan (test 1002). If not, the central station determines the process that called the meal plan ordering process (action 1004) and returns to the particular process (e.g., transfers 1006, 1008, 1010).

If the central station determines that there are meal products to expand (test 1002), the central station gets the meal plan to be expanded (action 1012) and determines (test 1014) whether the meal plan is a weekly meal plan (i.e., a plan of more than one meal as opposed to, for example, a plan for a single meal). If multiple meals are involved, the central station gets all meal plans from a meal plan database (action 1016), including a listing of the particular products which are ingredients of the meals. The central station then determines the type and quantities of ingredient products necessary to make the selected meals (action 1018). The order is adjusted to reflect the products necessary for the meal plan (action 1020). The central station then determines if another meal of the meal plan needs to be expanded (test 1002).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of merchandise ordering and order fulfillment from a product storage space, said method comprising:

providing an order processing system comprising a central station interfaced to a communication network so as be accessible to customers via the communication network for creation of a merchandise order, the order processing system including a database of product locations representing locations of products in the product storage space from which the merchandise order is to be fulfilled;

assembling a customer merchandise order for fulfillment from the product storage space, including receiving identification of product items to be added to the merchandise order and the quantity of each identified product item; and fulfilling the merchandise order from the product storage space, including the steps of:

compiling a listing of the product items of one or more merchandise orders to be assembled in the product storage space, identifying the product locations in the product storage space of each of the product items on the listing of product items from the database of product locations; and determining a merchandise order fulfillment path through the product storage space, the order fulfillment path comprising a sequence of person movement instructions between the product locations of product items on the listing of product items.

2. The method of claim 1 wherein the product storage space is a product display space of a grocery store.

3. The method of claim 1 wherein the step of fulfilling the merchandise order additionally comprises providing the sequence of person movement instructions to a person to assemble the merchandise order in the product storage space.

4. The method of claim 3 wherein the step of providing the sequence of person movement instructions to a person comprises sending the sequence of person movement instructions to a wireless device carried by a person assembling the merchandise order.

5. The method of claim 3 wherein the step of providing the sequence of person movement instructions to a person comprises providing a listing of product items in an order reflecting the sequence of person movement instructions in the product storage space.

6. The method of claim 3 wherein the step of providing the sequence of person movement instructions to a person comprises providing a listing of product items for a merchandise order and a corresponding sequence of person movement instructions in the product storage space between the product locations of the product items of the listing.

7. The method of claim 1 wherein the step of fulfilling the merchandise order additionally comprises moving in the product storage space according to the sequence of person movement instructions.

8. The method of claim 7 wherein the step of fulfilling the merchandise order additionally comprises picking the product items from respective product locations in the product storage space while moving in the product storage space according to the sequence of person movement instructions.

9. The method of claim 1 wherein the product locations in the database of product locations include product groupings in the product storage space.

10. The method of claim 1 wherein the product locations in the database of product locations include aisle locations in the product storage space.

11. The method of claim 10 wherein the product locations in the database of product locations include aisle side locations in the product storage space.

12. The method of claim 10 wherein the product locations in the database of product locations include shelf locations in the product storage space.

13. The method of claim 1 wherein the sequence of person movement instructions of the order fulfillment path is arranged in a manner permitting efficient movement of the person moving in the product storage space.

14. The method of claim 1 wherein the sequence of person movement instructions of the order fulfillment path includes identification of a product item from the merchandise order and a corresponding product location for the product item that is a product grouping identification in the product storage space.

15. The method of claim 1 wherein the sequence of person movement instructions of the order fulfillment path includes identification of a product item from the merchandise order and a corresponding product location for the product item that is an aisle identification in the product storage space.

16. The method of claim 1 wherein the sequence of person movement instructions of the order fulfillment path includes identification of a product item from the merchandise order and a corresponding product location for the product item that is an aisle side identification in the product storage space.

17. A method of merchandise order fulfillment from a product storage space, said method comprising:

receiving at least one merchandise order, including identification of product items of the merchandise order, by an order processing system comprising a central station interfaced to a communication network so as be accessible to customers via the communication network for creation of a merchandise order, the order processing system including a database of product locations representing locations of products in the product storage space from which the merchandise order is to be fulfilled;

providing a database of product locations representing locations of products in the product storage space from which the at least one merchandise order is to be fulfilled;

fulfilling the at least one merchandise order from the product storage space, including the steps of:

compiling a listing of the product items of the at least one merchandise order to be assembled in the product storage space, identifying the product locations in the product storage space of each of the product items on the listing of product items from the database of product locations; and determining a merchandise order fulfillment path through the product storage space, the order fulfillment path comprising a sequence of person movement instructions between the product locations of product items on the listing of product items.

18. A method of merchandise ordering and order fulfillment from a grocery store environment that includes a retail grocery product storage space, said method comprising:

providing an order processing system comprising a central station interfaced to a communication network so as be accessible to customers via the communication network for creation of a merchandise order, the order processing system including a database of product locations representing locations of products in the retail grocery product storage space from which the merchandise order is to be fulfilled;

assembling a customer merchandise order for fulfillment from the retail product storage space, including receiving identification of product items to be added to the merchandise order and the quantity of each identified product item; and fulfilling the merchandise order from the retail product storage space, including the steps of:
  compiling a listing of the product items of one or more merchandise orders to be assembled in the retail grocery product storage space,
  identifying the product locations in the retail grocery product storage space of each of the product items on the listing of product items from the database of product locations; and
  determining a merchandise order fulfillment path through the retail grocery product storage space, the order fulfillment path comprising a sequence of person movement instructions between the product locations of product items on the listing of product items;
  wherein the determining of the merchandise order fulfillment path is performed prior to movement of the person along the order fulfillment path.

19. The method of claim 18 wherein the retail grocery product storage space is accessible to the public.

20. The method of claim 1 wherein the communication network is the Internet.

21. The method of claim 1 wherein the communication network is a telephone communication network.

22. A method of merchandise order fulfillment from a grocery store environment that includes a retail grocery product storage space, said method comprising:
  receiving at least one merchandise order including identification of product items of the merchandise order, by an order processing system comprising a central station interfaced to a communication network so as be accessible to customers via the communication network for creation of a merchandise order, the order processing system including a database of product locations representing locations of products in the product storage space from which the merchandise order is to be fulfilled;
  providing a database of product locations representing locations of products in the retail grocery product storage space from which the merchandise order is to be fulfilled;
  fulfilling the at least one merchandise order from the product storage space, including the steps of:
    compiling a listing of the product items of the at least one merchandise order to be assembled in the retail grocery product storage space,
    identifying the product locations in the retail grocery product storage space of each of the product items on the listing of product items from the database of product locations; and
    determining a merchandise order fulfillment path through the retail grocery product storage space by converting the listing of product items into a sequence of person movement instructions to guide movement of the person assembling one or more orders between the product locations of product items on the listing of product items.

* * * * *